US012425590B2

(12) United States Patent
Wang et al.

(10) Patent No.: US 12,425,590 B2
(45) Date of Patent: *Sep. 23, 2025

(54) METHODS AND APPARATUS OF VIDEO CODING FOR TRIANGLE PREDICTION

(71) Applicant: BEIJING DAJIA INTERNET INFORMATION TECHNOLOGY CO., LTD., Beijing (CN)

(72) Inventors: Xianglin Wang, San Diego, CA (US); Yi-Wen Chen, San Diego, CA (US)

(73) Assignee: BEIJING DAJIA INTERNET INFORMATION TECHNOLOGY CO., LTD., Beijing (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/402,702

(22) Filed: Jan. 2, 2024

(65) Prior Publication Data

US 2024/0187584 A1    Jun. 6, 2024

Related U.S. Application Data

(63) Continuation of application No. 17/975,546, filed on Oct. 27, 2022, now Pat. No. 11,909,969, which is a
(Continued)

(51) Int. Cl.
*H04N 19/119* (2014.01)
*H04N 19/115* (2014.01)
*H04N 19/52* (2014.01)

(52) U.S. Cl.
CPC ......... *H04N 19/119* (2014.11); *H04N 19/115* (2014.11); *H04N 19/52* (2014.11)

(58) Field of Classification Search
CPC .................. H04N 19/70; H04N 19/119
See application file for complete search history.

(56) References Cited

U.S. PATENT DOCUMENTS 11,109,041 B2    8/2021    Ye et al.
2012/0300850 A1    11/2012    Yie et al.
(Continued)

FOREIGN PATENT DOCUMENTS

CN    102044089 A    5/2011
CN    103649775 A    3/2014
(Continued)

OTHER PUBLICATIONS

International Search Report of PCT Application No. PCT/US2019/068975 dated Apr. 28, 2020, (3p).
(Continued)

*Primary Examiner* — Kyle M Lotfi
(74) *Attorney, Agent, or Firm* — Arch & Lake LLP

(57) ABSTRACT

A method for video coding is provided. The method includes: partitioning video pictures into a plurality of coding units (CUs), at least one of which is further portioned into two prediction units (PUs) including at least one triangular shaped PU with a partitioning orientation in one of: from top-left corner to bottom-right corner, and from top-right corner to bottom-left corner; constructing a uni-prediction motion vector candidate list; determining whether a current CU is coded as triangle prediction mode according to coded information; signaling a partition orientation flag indicating the partitioning orientation; and signaling index values that indicate selected entries in the constructed uni-prediction motion vector candidate list.

13 Claims, 9 Drawing Sheets

Related U.S. Application Data continuation of application No. 17/364,034, filed on Jun. 30, 2021, now Pat. No. 11,622,111, which is a continuation of application No. PCT/US2019/068975, filed on Dec. 30, 2019.

(60) Provisional application No. 62/787,219, filed on Dec. 31, 2018, provisional application No. 62/786,545, filed on Dec. 30, 2018.

(56) References Cited

U.S. PATENT DOCUMENTS

| | | |
|---|---|---|
| 2013/0188704 A1 | 7/2013 | Zhou |
| 2014/0098882 A1 | 4/2014 | Li et al. |
| 2014/0219363 A1 | 8/2014 | Seregin et al. |
| 2015/0341655 A1 | 11/2015 | Joshi et al. |
| 2016/0219302 A1 | 7/2016 | Liu et al. |
| 2017/0272750 A1 | 9/2017 | An et al. |
| 2018/0070100 A1 | 3/2018 | Chen et al. |
| 2018/0213251 A1 | 7/2018 | Ikonin et al. |
| 2018/0255304 A1 | 9/2018 | Jeon et al. |
| 2018/0332305 A1 | 11/2018 | Lin et al. |
| 2020/0017787 A1 | 1/2020 | Foody et al. |
| 2020/0186799 A1* | 6/2020 | Wang ............... H04N 19/176 |
| 2021/0250581 A1 | 8/2021 | Xu et al. |
| 2022/0021900 A1* | 1/2022 | Jeong ............... H04N 19/523 |
| 2022/0078460 A1* | 3/2022 | Misra ................ H04N 19/46 |
| 2022/0078488 A1* | 3/2022 | Leleannec ......... H04N 19/70 |

FOREIGN PATENT DOCUMENTS

| | | |
|---|---|---|
| CN | 104170381 A | 11/2014 |
| CN | 104685874 A | 6/2015 |
| CN | 105308965 A | 2/2016 |
| CN | 107113440 A | 8/2017 |
| CN | 107646195 A | 1/2018 |
| CN | 107925772 A | 4/2018 |
| CN | 108141603 A | 6/2018 |
| CN | 108353184 A | 7/2018 |
| CN | 108432250 A | 8/2018 |
| CN | 108432252 A | 8/2018 |
| CN | 108874265 A | 11/2018 |
| JP | 2018533860 A | 11/2018 |
| JP | 7171928 B2 | 11/2022 |
| KR | 101595899 B1 | 2/2016 |
| KR | 1020170108367 A | 9/2017 |
| KR | 20180043151 A | 4/2018 |
| KR | 1020180082330 A | 7/2018 |
| KR | 1020180134764 A | 12/2018 |
| WO | 2015127581 A1 | 9/2015 |
| WO | 2016159631 A1 | 10/2016 |
| WO | 2018128466 A1 | 7/2018 |

OTHER PUBLICATIONS

Timeline-JVET VVC, Nov. 13, 2018 first cited in the extended European Search Report of counterpart EP Application No. 19907122.6 from EPO on Apr. 20, 2022 (1p).

Suggested_fix.diff on Ticket#105-Attachment-JVET VVC first cited in the Search Report of counterpart EP Application No. 19907122.6 from EPO on Apr. 20, 2022, (1p).

105 Triangle flag redundant signalling first cited in the extended European Search Report of counterpart EP Application No. 19907122.6 from EPO on Apr. 20, 2022, (1p).

Chiang, Man-Shu et al., "CE10.1.1 Multi-hypothesis prediction for improving AMVP mode, skip or merge mode, and intra mode", Joint Video Experts Team (JVET) of ITU-T SG 16 WP and ISO/IEC JTC 1/SC 29WG 11, JVET-L0100-v1, 12th Meeting: Macao, China Oct. 3-12, 2018, (13p).

Wang, Hongtao et al., "CE10-related Using regular merge index signaling for triangle mode", Joint Video Experts Team (JVET) of ITU-T SG 16 WP 3 and ISO/IEC JTC 1/SC 29/WG 11, JVET-M0883, 13th Meeting: Marrakech, MA, Jan. 9-18, 2019, (3p).

Poirier, Tangi et al., "CE10-related Multiple prediction unit shapes", Joint Video Experts Team (JVET) of ITU-T SG 16 WP 3 and ISO/IEC JTC 1/SC 29/WG11, JVET-L0208-v1, 12th Meeting: Macao, China, Oct. 3-12, 2018, (6p).

European Search Report—Supplementary European Search Report dated Apr. 20, 2022, (9p).

Second EPOA issued in Application No. 19907122.6, dated Oct. 4, 2022,(7p).

Yi-Wen Chen et al., Kwai Inc, "Non-CE4: Redundancy removal in merge modes signaling", Joint Video Experts Team (JVET), JVET-O0586, of ITU-T SG 16 WP 3 and ISO/IEC JTC 1/SC 29/WG 11 15th Meeting: Gothenburg, SE, Jul. 3-12, 2019,(5p).

Liao, Ru-Ling, et al., "CE10.3.1.b: Triangular Prediction Unit Mode", Joint Video Exploration Team (JVET) of ITU-T SG 16 WP 3 and ISO/IEC JTC 1/SC 29/WG11, JVET-L0124-v2, 12 Meeting, Macao, China Oct. 3-12, 2018, (8p).

Bross, Benjamin, et al., Versatile Video Coding (Draft 3), Joint Video Experts Team (JVET) of ITU-T-SG 16 WP 3 and ISO/IEC JTC 1/SC 29/WG 11, JVET-L1001-v7, 12th Meeting Macao, China, Oct. 3-12, 2018, (219p).

Partial Supplementary European Search Report of EP Application No. 19907122.6 dated Jan. 4, 2022, (13p).

JPOA Notice of Reasons for Refusal issued to Japanese Application No. 2022-176339, dated Apr. 25, 2023 with English translation, (15p).

CN-NOA issued to Chinese Application No. 202111625731.1 dated Jan. 19, 2023 with English translation, (8p).

Bross, Benjamin, et al., "Versatile Video Coding" (Draft 5), Joint Video Experts Team (JVET) of ITU-T SG 16 WP 3 and ISO/IEC JTC 1/SC 29/WG 11, JVET-N1001-v10, 14th Meeting: Geneva, CH, Mar. 19-27, 2019, (13p).

Chen et al., "Context Reduction for Inter and Split Syntax Elements", Joint Video Experts Team (JVET) of ITU-T SG 16 WP 3 and ISO/IEC JTC 1/SC 29/WG 11, Document: JVET-N0600, 14th Meeting: Geneva, CH, Mar. 19-27, 2019, (7p).

EP Communication of EP Application No. 19907122.6 dated Nov. 6, 2023, (7p).

Official Communication regarding oral proceedings for EP19907122.6 issued by EPO on Apr. 4, 2024, (12p).

Kenneth Vermeirsch et al., "Software and results for extended partitioning," Video Coding Experts Group (VCEG) ITU-Telecommunications Standardization Sector, VCEG-AI25, Study Group 16 Question 6, 35th Meeting: Berlin, Germany, Jul. 16-18, 2008, (11p).

Tadamasa Toma et al., "Description of SDR video coding technology proposal by Panasonic," Joint Video Experts Team(JVET) of ITU-T SG 16 WP 3 and ISO/IEC JTC 1/SC 29/WG 11, JVET-J0020-v1, 10th Meeting: San Diego, US, Apr. 10-20, 2018, (75p).

Yanfei Shen, "High Efficiency Video Coding", Chinese Journal of Computers, vol. 36 No. 11, Nov. 2013, (16p).

First Office Action of CN 202310180336.X issued by CNIPA dated Jul. 17, 2023, with English translation, (11p).

Notice of Allowance of CN 202310180336.X issued by CNIPA dated Sep. 21, 2023, (9p).

JPOA issued in Application No. 2024-133771 dated May 7, 2025 with English translation, (7p).

* cited by examiner

TL2BR

TL2BR_1_4

TL2BR_3_4

TR2BL

TR2BL_1_4

TR2BL_3_4

VER

VER_1_4

VER_3_4

HOR

HOR_1_4

HOR_3_4 partitioning video pictures into a plurality of coding units (CUs), at least one of which is further portioned into two prediction units (PUs) including at least one triangular shaped PU with a partitioning orientation in one of: from top-left corner to bottom-right corner, and from top-right corner to bottom-left corner
1602 constructing a uni-prediction motion vector candidate list
1604 determining whether a current CU is coded as triangle prediction mode according to coded information
1606 signaling a partition orientation flag indicating the partitioning orientation
1608 signaling index values that indicate selected entries in the constructed uni-prediction motion vector candidate list
1610

FIG. 16 partitioning video pictures into a plurality of coding units (CUs), at least one of which is further portioned into two prediction units (PUs) including at least one triangular shaped PU
1702 determining whether a triangle prediction flag, which indicates triangle prediction mode, is to be decoded for a current CU
1704 deriving the triangle prediction flag using CABAC upon determining that the triangle prediction flag is to be decoded for the current CU; wherein contexts of the CABAC for the triangle prediction flag are derived based on at least one selected from a group consisting of: a CU area size; a CU shape; and a common context
1706

FIG. 17

METHODS AND APPARATUS OF VIDEO CODING FOR TRIANGLE PREDICTION

CROSS-REFERENCE TO RELATED APPLICATIONS

The present application is a continuation application of U.S. application Ser. No. 17/975,546, filed on Oct. 27, 2022, which is a continuation of U.S. application Ser. No. 17/364,034 filed Jun. 30, 2021 which is a continuation of International Application PCT/US2019/068975, filed on Dec. 30, 2019, which claims priority to U.S. Provisional Application No. 62/786,545, entitled "Triangle Prediction Flag Signalling in Video Coding" filed on Dec. 30, 2018, and U.S. Provisional Application No. 62/787,219, entitled "Triangle Prediction Syntax Coding" filed on Dec. 31, 2018, all of which are incorporated by reference in their entireties for all purpose.

FIELD

The present application generally relates to video coding and compression, and in particular but not limited to, methods and apparatus for motion compensated prediction using triangular prediction unit in video coding.

BACKGROUND

The following abbreviations and acronyms are herewith defined, at least some of which are referred to within the following description: International Telecommunication Union (ITU), ITU Telecommunication Standardization Sector (ITU-T), International Organization for Standardization (ISO/IEC), International Electrotechnical Commission (IEC), Moving Picture Experts Group (MPEG), Advanced Video Coding (AVC), High Efficiency Video Coding (HEVC), Versatile Video Coding (VVC), Joint Exploration Test Model (JEM), VVC Test Model (VTM), Joint Video Experts Team (JVET), Video Coding Experts Group (VCEG), Motion Vector (MV), Motion Vector Prediction (MVP), Motion Vector Difference (MVD), Motion Vector Field (MVF), Advanced Motion Vector Prediction (AMVP), Motion Vector Competition (MVC), Temporal Motion Vector Prediction (TMVP), Control Point Motion Vector (CPMV), Adaptive Loop Filter (ALF), Bi-predictive (B), Block Copy (BC), Context-based Adaptive Binary Arithmetic Coding (CABAC), Context Adaptive Variable Length Coding (CAVLC), Coding Block (CB), encoder/decoder (CODEC), Coded Picture Buffer (CPB), Coding Tree Block (CTB), Coding Tree Unit (CTU), Coding Unit (CU), Discrete Cosine Transform (DCT), Decoded Picture Buffer (DPB), Intra (I), Intra Block Copy (IBC), Predictive (P), Prediction Block (PB), Probability Interval Partitioning Entropy (PIPE), Picture Order Count (POC), Picture Unit (PU), Sum Of Absolute Difference (SAD), Sample Adaptive Offset (SAO), Syntax-Based Context-Adaptive Binary Arithmetic Coding (SBAC), Sequence Parameter Set (SPS), Sum Of Square Difference (SSD), Transform Unit (TU), Quadtree Plus Binary Tree (QTBT), pixel, or picture element (pel), Advanced Temporal Level Motion Vector Prediction (ATMVP), Ultimate Motion Vector Expression (UMVE), Merge Mode with Motion Vector Difference (MMVD), Index (IDX), Combined Inter and Intra Prediction (CIIP), Most Probable Mode (MPM).

Digital video is supported by a variety of electronic devices, such as digital televisions, laptop or desktop computers, tablet computers, digital cameras, digital recording devices, digital media players, video gaming consoles, smart phones, video teleconferencing devices, video streaming devices, etc. The electronic devices transmit, receive, encode, decode, and/or store digital video data by implementing video compression/decompression. Digital video devices implement video coding techniques, such as those described in the standards defined by Versatile Video Coding (VVC), Joint Exploration Test Model (JEM), MPEG-2, MPEG-4, ITU-T H.263, ITU-T H.264/MPEG-4, Part 10, Advanced Video Coding (AVC), ITU-T H.265/High Efficiency Video Coding (HEVC), and extensions of such standards.

Video coding generally utilizes prediction methods (e.g., inter-prediction, intra-prediction) that take advantage of redundancy present in video images or sequences. An important goal of video coding techniques is to compress video data into a form that uses a lower bit rate, while avoiding or minimizing degradations to video quality. With ever-evolving video services becoming available, encoding techniques with better coding efficiency are needed.

Video compression typically includes performing spatial (intra frame) prediction and/or temporal (inter frame) prediction to reduce or remove redundancy inherent in the video data. For block-based video coding, a video frame is partitioned into one or more slices, each slice having multiple video blocks, which may also be referred to as coding tree units (CTUs). Each CTU may contain one coding unit (CU) or recursively split into smaller CUs until the predefined minimum CU size is reached. Each CU (also named leaf CU) contains one or multiple transform units (TUs) and each CU also contains one or multiple prediction units (PUs). Each CU can be coded in intra, inter or IBC modes. Video blocks in an intra coded (I) slice of a video frame are encoded using spatial prediction with respect to reference samples in neighbor blocks within the same video frame. Video blocks in an inter coded (P or B) slice of a video frame may use spatial prediction with respect to reference samples in neighbor blocks within the same video frame or temporal prediction with respect to reference samples in other previous and/or future reference video frames.

Spatial or temporal prediction based on a reference block that has been previously encoded, e.g., a neighbor block, results in a predictive block for a current video block to be coded. The process of finding the reference block may be accomplished by block matching algorithm. Residual data representing pixel differences between the current block to be coded and the predictive block is referred to as a residual block or prediction errors. An inter-coded block is encoded according to a motion vector that points to a reference block in a reference frame forming the predictive block, and the residual block. The process of determining the motion vector is typically referred to as motion estimation. An intra coded block is encoded according to an intra prediction mode and the residual block. For further compression, the residual block is transformed from the pixel domain to a transform domain, e.g., frequency domain, resulting in residual transform coefficients, which may then be quantized. The quantized transform coefficients, initially arranged in a two-dimensional array, may be scanned to produce a onedimensional vector of transform coefficients, and then entropy encoded into a video bitstream to achieve even more compression.

The encoded video bitstream is then saved in a computer-readable storage medium (e.g., flash memory) to be accessed by another electronic device with digital video capability or directly transmitted to the electronic device wired or wirelessly. The electronic device then performs video decompression (which is an opposite process to the video compression described above) by, e.g., parsing the encoded video bitstream to obtain syntax elements from the bitstream and reconstructing the digital video data to its original format from the encoded video bitstream based at least in part on the syntax elements obtained from the bitstream, and renders the reconstructed digital video data on a display of the electronic device.

With digital video quality going from high definition, to 4K×2K or even 8K×4K, the amount of vide data to be encoded/decoded grows exponentially. It is a constant challenge in terms of how the video data can be encoded/decoded more efficiently while maintaining the image quality of the decoded video data.

In a Joint Video Experts Team (JVET) meeting, JVET defined the first draft of Versatile Video Coding (VVC) and the VVC Test Model 1 (VTM1) encoding method. It was decided to include a quadtree with nested multi-type tree using binary and ternary splits coding block structure as the initial new coding feature of VVC. Since then, the reference software VTM to implement the encoding method and the draft VVC decoding process has been developed during the JVET meetings.

SUMMARY

In general, this disclosure describes examples of techniques relating to motion compensated prediction using triangular prediction unit in video coding.

According to a first aspect of the present disclosure, there is provided a method for video coding, including: partitioning video pictures into a plurality of coding units (CUs), at least one of which is further portioned into two prediction units (PUs) including at least one triangular shaped PU with a partitioning orientation in one of: from top-left corner to bottom-right corner, and from top-right corner to bottom-left corner; constructing a uni-prediction motion vector candidate list; determining whether a current CU is coded as triangle prediction mode according to coded information; signaling a partition orientation flag indicating the partitioning orientation; and signaling index values that indicate selected entries in the constructed uni-prediction motion vector candidate list.

According to a second aspect of the present disclosure, there is provided a method for video coding, including: partitioning video pictures into a plurality of coding units (CUs), at least one of which is further portioned into two prediction units (PUs) including at least one triangular shaped PU; determining whether a triangle prediction flag, which indicates triangle prediction mode, is to be decoded for a current CU; and deriving the triangle prediction flag using CABAC upon determining that the triangle prediction flag is to be decoded for the current CU; where contexts of the CABAC for the triangle prediction flag are derived based on at least one selected from a group consisting of: a CU area size; a CU shape; and a common context.

According to a third aspect of the present disclosure, there is provided an apparatus for video coding, including: a processor; and a memory configured to store instructions executable by the processor; where the processor, upon execution of the instructions, is configured to: partition video pictures into a plurality of coding units (CUs), at least one of which is further portioned into two prediction units (PUs) including at least one triangular shaped PU with a partitioning orientation in one of: from top-left corner to bottom-right corner, and from top-right corner to bottom-left corner; construct a uni-prediction motion vector candidate list; determine whether a current CU is coded as triangle prediction mode according to coded information; signal a partition orientation flag indicating the partitioning orientation; and signal index values that indicate selected entries in the constructed uni-prediction motion vector candidate list.

According to a fourth aspect of the present disclosure, there is provided an apparatus for video coding, including: a processor; and a memory configured to store instructions executable by the processor; where the processor, upon execution of the instructions, is configured to: partition video pictures into a plurality of coding units (CUs), at least one of which is further portioned into two prediction units (PUs) including at least one triangular shaped PU; determine whether a triangle prediction flag, which indicates triangle prediction mode, is to be decoded for a current CU; and derive the triangle prediction flag using CABAC upon determining that the triangle prediction flag is to be decoded for the current CU; where contexts of the CABAC for the triangle prediction flag are derived based on at least one selected from a group consisting of: a CU area size; a CU shape; and a common context.

BRIEF DESCRIPTION OF DRAWINGS

A more particular description of the examples of the present disclosure will be rendered by reference to specific examples illustrated in the appended drawings. Given that these drawings depict only some examples and are not therefore considered to be limiting in scope, the examples will be described and explained with additional specificity and details through the use of the accompanying drawings.

FIG. 16 is a flowchart illustrating an exemplary process of video coding for motion compensated prediction using triangular prediction in accordance with some implementations of the present disclosure.

FIG. 17 is a flowchart illustrating an exemplary process of video coding for triangle prediction flag in accordance with some implementations of the present disclosure.

DETAILED DESCRIPTION

Figure 1:
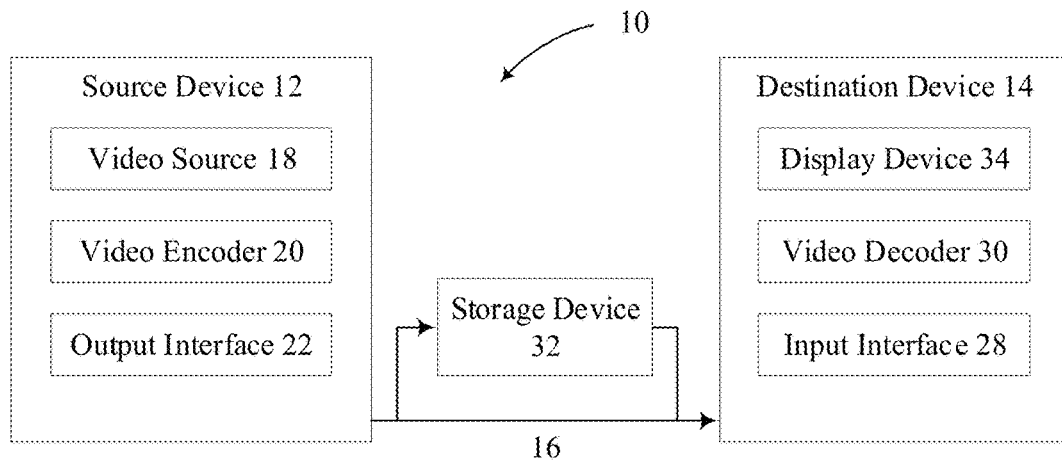
FIG. 1 is a block diagram illustrating an exemplary video encoding and decoding system in accordance with some implementations of the present disclosure.

Reference will now be made in detail to specific implementations, examples of which are illustrated in the accompanying drawings. In the following detailed description, numerous non-limiting specific details are set forth in order to assist in understanding the subject matter presented herein. But it will be apparent to one of ordinary skill in the art that various alternatives may be used. For example, it will be apparent to one of ordinary skill in the art that the subject matter presented herein can be implemented on many types of electronic devices with digital video capabilities.

The description of elements in each figure may refer to elements of other figures. Like-numbers may refer to like-elements in the figures, including alternative embodiments of like-elements.

Reference throughout this specification to "one embodiment," "an embodiment," "an example," "some embodiments," "some examples," or similar language means that a particular feature, structure, or characteristic described is included in at least one embodiment or example. Thus, instances of the phrases "in one embodiment," "in an example," "in some embodiments," and similar language throughout this specification may, but do not necessarily, all refer to the same embodiment(s). It may or may not include all the embodiments disclosed. Features, structures, elements, or characteristics described in connection with one or some embodiments are also applicable to other embodiments, unless expressly specified otherwise.

The schematic flowchart diagrams and/or schematic block diagrams in the figures illustrate the architecture, functionality, and operation of possible implementations of different apparatuses, systems, methods, and program products according to various embodiments. In this regard, each block in the schematic flowchart diagrams and/or schematic block diagrams may represent a module, segment, or portion of code, which includes one or more executable instructions of the code for implementing the specified logical function(s). One skilled in the relevant art will recognize, however, that the flowchart diagrams need not necessarily be practiced in the sequence shown and are able to be practiced without one or more of the specific steps, or with other steps not shown.

It should also be noted that, in some alternative implementations, the functions noted in the identified blocks may occur out of the order noted in the figures. For example, two blocks shown in succession may, in fact, be substantially executed in concurrence, or the blocks may sometimes be executed in reverse order, depending upon the functionality involved. Other steps and methods may be conceived that are equivalent in function, logic, or effect to one or more blocks, or portions thereof, to the illustrated figures.

The terminology used in the present disclosure is for the purpose of describing particular examples only and is not intended to limit the present disclosure. The terms "including," "comprising," "having," and variations thereof mean "including but not limited to," unless expressly specified otherwise.

It shall be further understood that these terms specify the presence of stated features, integers, steps, operations, elements and/or components, but do not preclude the presence or addition of one or more other features, integers, steps, operations, elements, components and/or combinations thereof.

An enumerated listing of items does not imply that any or all of the items are mutually exclusive, unless expressly specified otherwise.

As used in this disclosure and the appended claims, the singular forms "a," "an," and "the" are intended to include the plural forms as well, and should be interpreted as equivalent to "one or more" or "at least one," unless the context clearly indicates otherwise.

It should be understood that the term "and/or" as used herein refers to and includes any and all possible combinations of one or more of the associated listed items. For example, "A and/or B" may refer to any one of the following three combinations: existence of A only, existence of B only, and co-existence of both A and B.

The character "/" generally indicates an "or" relationship of the associated items, but may also include an "and" relationship of the associated items. For example, "A/B" may also include the co-existence of both A and B, unless the context indicates otherwise.

Throughout the disclosure, the terms "first," "second," "third," and etc. are all used as nomenclature only for references to relevant elements, e.g. devices, components, compositions, steps, and etc., without implying any spatial or chronological orders, unless expressly specified otherwise. For example, a "first device" and a "second device" may refer to two separately formed devices, or two parts, components or operational states of a same device, and may be named arbitrarily.

A first element and a second element may exist independently. For example, some embodiments may include a second element only, without any first element. Accordingly, a second element may be described, prior to description of a first element, or without description of the first element. For example, a "first step" of a method or process may be carried or performed after, or simultaneously with, a "second step."

As used herein, the term "if" or "when" may be understood to mean "upon" or "in response to" depending on the context. These terms, if appear in a claim, may not indicate that the relevant limitations or features are conditional or optional. For example, a method may comprise steps of: i) when or if condition X is present, function or action X' is performed, and ii) when or if condition Y is present, function or action Y' is performed. It may require the method to be implemented with both the capability of performing function or action X', and the capability of performing function or action Y', while the functions X' and Y' may both be performed, at different times, on multiple executions of the method. It may further be implemented with the capability of detecting or evaluating satisfaction of condition X, and the capability of detecting or evaluating satisfaction of condition Y.

The terms "module," "sub-module," "circuit," "sub-circuit," "circuitry," "sub-circuitry," "unit," or "sub-unit" may include memory (shared, dedicated, or group) that stores code or instructions that can be executed by one or more processors. A module may include one or more circuits with or without stored code or instructions. The module or circuit may include one or more components that are directly or indirectly connected. These components may or may not be physically attached to, or located adjacent to, one another.

A unit or module may be implemented purely by software, purely by hardware, or by a combination of hardware and software. In a pure software implementation, for example, the unit or module may include functionally related code blocks or software components, that are directly or indirectly linked together, so as to perform a particular function.

FIG. 1 is a block diagram illustrating an exemplary system 10 for encoding and decoding video blocks in accordance with some implementations of the present disclosure. As shown in FIG. 1, the system 10 includes a source device 12 that generates and encodes video data which is to be decoded at a later time by a destination device 14. The source device 12 and the destination device 14 may be any of a wide variety of electronic devices, including desktop or laptop computers, tablet computers, smart phones, set-top boxes, digital televisions, cameras, display devices, digital media players, video gaming consoles, video streaming device, or the like. In some implementations, the source device 12 and the destination device 14 are equipped with wireless communication capabilities.

In some implementations, the destination device 14 may receive the encoded video data to be decoded via a link 16. The link 16 may be any type of communication medium or device capable of moving the encoded video data from the source device 12 to the destination device 14. In one example, the link 16 may be a communication medium to enable the source device 12 to transmit the encoded video data directly to the destination device 14 in real-time. The encoded video data may be modulated according to a communication standard, such as a wireless communication protocol, and transmitted to the destination device 14. The communication medium may be any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from the source device 12 to the destination device 14.

In some other implementations, the encoded video data may be transmitted from an output interface 22 to a storage device 32. Subsequently, the encoded video data in the storage device 32 may be accessed by the destination device 14 via an input interface 28. The storage device 32 may include any of a variety of distributed or locally accessed data storage media such as a hard drive, Blu-ray discs, DVDs, CD-ROMs, flash memory, volatile or non-volatile memory, or any other suitable digital storage media for storing encoded video data. In a further example, the storage device 32 may correspond to a file server or another intermediate storage device that may hold the encoded video data generated by the source device 12. The destination device 14 may access the stored video data from the storage device 32 via streaming or downloading. The file server may be any type of computer capable of storing encoded video data and transmitting the encoded video data to the destination device 14. Exemplary file servers include a web server (e.g., for a website), an FTP server, network attached storage (NAS) devices, or a local disk drive. The destination device 14 may access the encoded video data through any standard data connection, including a wireless channel (e.g., a Wi-Fi connection), a wired connection (e.g., DSL, cable modem, etc.), or a combination of both which is suitable for accessing encoded video data stored on a file server. The transmission of the encoded video data from the storage device 32 may be a streaming transmission, a download transmission, or a combination of both.

As shown in FIG. 1, the source device 12 includes a video source 18, a video encoder 20 and the output interface 22. The video source 18 may include a source such as a video capture device, e.g., a video camera, a video archive containing previously captured video, a video feed interface to receive video from a video content provider, and/or a computer graphics system for generating computer graphics data as the source video, or a combination of such sources. As one example, if the video source 18 is a video camera of a security surveillance system, the source device 12 and the destination device 14 may be camera phones or video phones. However, the implementations described in the present disclosure may be applicable to video coding in general, and may be applied to wireless and/or wired applications.

The captured, pre-captured, or computer-generated video may be encoded by the video encoder 20. The encoded video data may be transmitted directly to the destination device 14 via the output interface 22 of the source device 12. The encoded video data may also (or alternatively) be stored onto the storage device 32 for later access by the destination device 14 or other devices, for decoding and/or playback. The output interface 22 may further include a modem and/or a transmitter.

The destination device 14 includes an input interface 28, a video decoder 30, and a display device 34. The input interface 28 may include a receiver and/or a modem and receive the encoded video data over the link 16. The encoded video data communicated over the link 16, or provided on the storage device 32, may include a variety of syntax elements generated by the video encoder 20 for use by the video decoder 30 in decoding the video data. Such syntax elements may be included within the encoded video data transmitted on a communication medium, stored on a storage medium, or stored a file server.

In some implementations, the destination device 14 may include the display device 34, which may be an integrated display device or an external display device that is configured to communicate with the destination device 14. The display device 34 displays the decoded video data to a user, and may be any of a variety of display devices such as a liquid crystal display (LCD), a plasma display, an organic light emitting diode (OLED) display, or another type of display device.

The video encoder 20 and the video decoder 30 may operate according to proprietary or industry standards, such as VVC, HEVC, MPEG-4, Part 10, Advanced Video Coding (AVC), or extensions of such standards. It should be understood that the present disclosure is not limited to a specific video coding/decoding standard and may be applicable to other video coding/decoding standards. It is generally contemplated that the video encoder 20 of the source device 12 may be configured to encode video data according to any of these current or future standards. Similarly, it is also generally contemplated that the video decoder 30 of the destination device 14 may be configured to decode video data according to any of these current or future standards.

The video encoder 20 and the video decoder 30 each may be implemented as any of a variety of suitable encoder circuitry, such as one or more microprocessors, digital signal processors (DSPs), application specific integrated circuits (ASICs), field programmable gate arrays (FPGAs), discrete logic, software, hardware, firmware or any combinations thereof. When implemented partially in software, an electronic device may store instructions for the software in a suitable, non-transitory computer-readable medium and execute the instructions in hardware using one or more processors to perform the video coding/decoding operations disclosed in the present disclosure. Each of the video encoder 20 and the video decoder 30 may be included in one or more encoders or decoders, either of which may be integrated as part of a combined encoder/decoder (CODEC) in a respective device.

Figure 2:
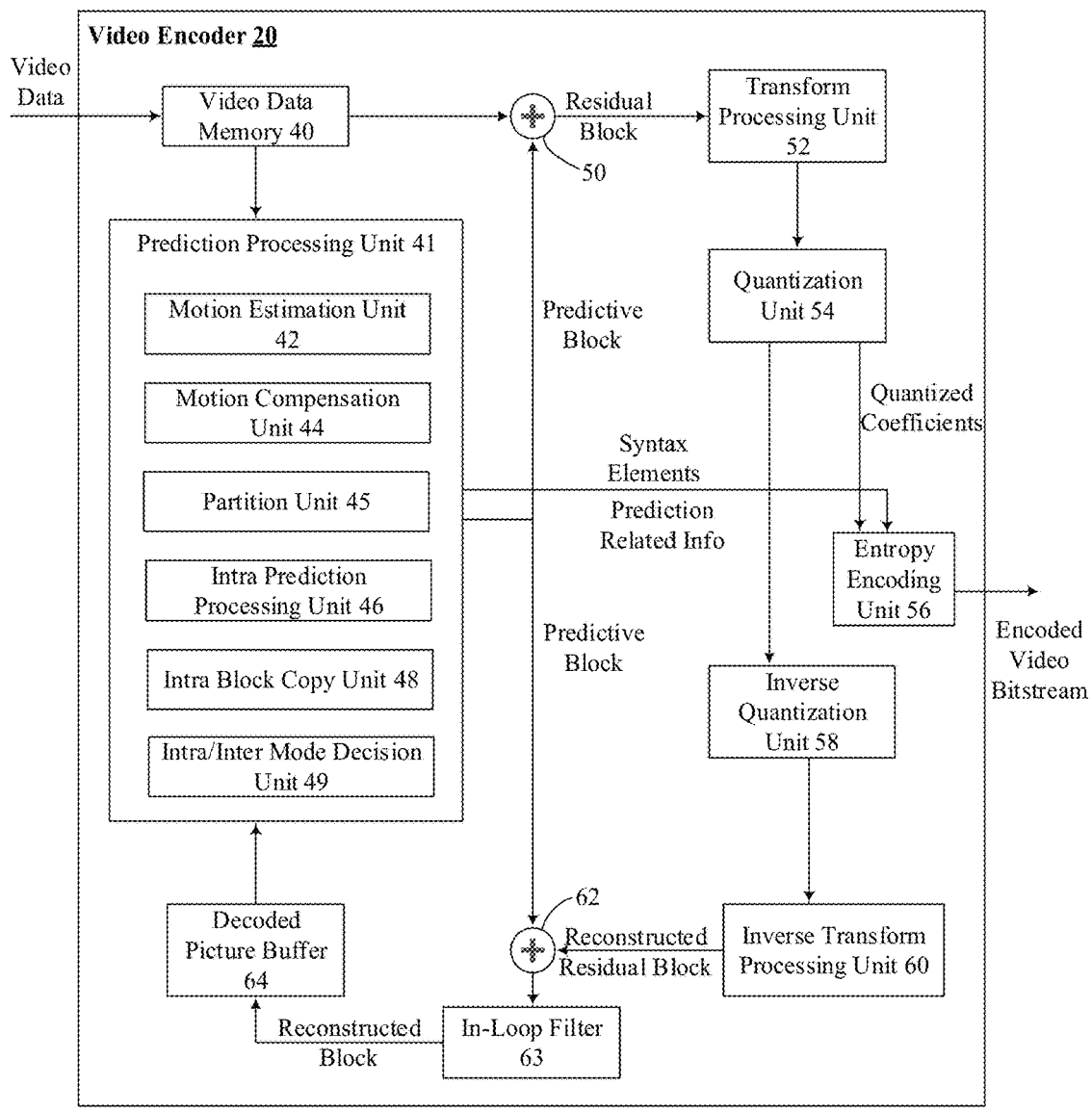
FIG. 2 is a block diagram illustrating an exemplary video encoder in accordance with some implementations of the present disclosure.

FIG. 2 is a block diagram illustrating an exemplary video encoder 20 in accordance with some implementations described in the present disclosure. The video encoder 20 may perform intra and inter predictive coding of video blocks within video frames. Intra predictive coding relies on spatial prediction to reduce or remove spatial redundancy in video data within a given video frame or picture. Inter predictive coding relies on temporal prediction to reduce or remove temporal redundancy in video data within adjacent video frames or pictures of a video sequence.

As shown in FIG. 2, the video encoder 20 includes a video data memory 40, a prediction processing unit 41, a decoded picture buffer (DPB) 64, a summer 50, a transform processing unit 52, a quantization unit 54, and an entropy encoding unit 56. The prediction processing unit 41 further includes a motion estimation unit 42, a motion compensation unit 44, a partition unit 45, an intra prediction processing unit 46, an intra block copy (IBC) unit 48, and an intra/inter mode decision unit 49. In some implementations, the video encoder 20 also includes an inverse quantization unit 58, an inverse transform processing unit 60, and a summer 62 for video block reconstruction. A deblocking filter may be positioned between the summer 62 and the DPB 64 to filter block boundaries to remove blockiness artifacts from a reconstructed video. An in-loop filter 63 may also be used in addition to the deblocking filter to filter the output of summer 62. The video encoder 20 may take the form of a fixed or programmable hardware unit or may be divided among one or more of the fixed or programmable hardware units.

The video data memory 40 may store video data to be encoded by the components of the video encoder 20. The video data in the video data memory 40 may be obtained, for example, from the video source 18. The DPB 64 is a buffer that stores reference video data for use in encoding video data by the video encoder 20 (e.g., in intra or inter predictive coding modes). The video data memory 40 and DPB 64 may be any of a variety of memory devices. In various examples, the video data memory 40 may be on-chip with other components of the video encoder 20, or off-chip relative to those components.

As shown in FIG. 2, after receiving video data, the partition unit 45 within the prediction processing unit 41 partitions the video data into video blocks. This partitioning may also include partitioning a video frame into slices, tiles, or other larger coding units (CUs) according to a predefined splitting structures such as quad-tree structure associated with the video data. The video frame may be divided into multiple video blocks (or sets of video blocks referred to as tiles). The prediction processing unit 41 may select one of a plurality of possible predictive coding modes, such as one of a plurality of intra predictive coding modes or one of a plurality of inter predictive coding modes, for the current video block based on error results (e.g., coding rate and the level of distortion). The prediction processing unit 41 may provide the resulting intra or inter prediction coded block to the summer 50 to generate a residual block and to the summer 62 to reconstruct the encoded block for use as part of a reference frame subsequently. The prediction processing unit 41 also provides syntax elements, such as motion vectors, intra-mode indicators, partition information, and other such syntax information, to the entropy encoding unit 56.

In order to select an appropriate intra predictive coding mode for the current video block, the intra prediction processing unit 46 within the prediction processing unit 41 may perform intra predictive coding of the current video block relative to one or more neighbor blocks in the same frame as the current block to be coded to provide spatial prediction. The motion estimation unit 42 and the motion compensation unit 44 within the prediction processing unit 41 perform inter predictive coding of the current video block relative to one or more predictive blocks in one or more reference frames to provide temporal prediction. The video encoder 20 may perform multiple coding passes, e.g., to select an appropriate coding mode for each block of the video data.

In some implementations, the motion estimation unit 42 determines the inter prediction mode for a current video frame by generating a motion vector, which indicates the displacement of a prediction unit (PU) of a video block within the current video frame relative to a predictive block within a reference video frame, according to a predetermined pattern within a sequence of video frames. Motion estimation, performed by the motion estimation unit 42, is the process of generating motion vectors, which estimate motion for video blocks. A motion vector, for example, may indicate the displacement of a PU of a video block within a current video frame or picture relative to a predictive block within a reference frame (or other coded unit) relative to the current block being coded within the current frame (or other coded unit). The predetermined pattern may designate video frames in the sequence as P frames or B frames. The intra BC unit 48 may determine vectors, e.g., block vectors, for intra BC coding in a manner similar to the determination of motion vectors by the motion estimation unit 42 for inter prediction, or may utilize the motion estimation unit 42 to determine the block vector.

A predictive block is a block of a reference frame that is deemed as closely matching the PU of the video block to be coded in terms of pixel difference, which may be determined by sum of absolute difference (SAD), sum of square difference (SSD), or other difference metrics. In some implementations, the video encoder 20 may calculate values for sub-integer pixel positions of reference frames stored in the DPB 64. For example, the video encoder 20 may interpolate values of one-quarter pixel positions, one-eighth pixel positions, or other fractional pixel positions of the reference frame. Therefore, the motion estimation unit 42 may perform a motion search relative to the full pixel positions and fractional pixel positions, and output a motion vector with fractional pixel precision.

The motion estimation unit 42 calculates a motion vector for a PU of a video block in an inter prediction coded frame by comparing the position of the PU to the position of a predictive block of a reference frame selected from a first reference frame list (e.g., List 0) or a second reference frame list (e.g., List 1), each of which identifies one or more reference frames stored in the DPB 64. The motion estimation unit 42 sends the calculated motion vector to the motion compensation unit 44 and then to the entropy encoding unit 56.

Motion compensation, performed by the motion compensation unit 44, may involve fetching or generating the predictive block based on the motion vector determined by the motion estimation unit 42. Upon receiving the motion vector for the PU of the current video block, the motion compensation unit 44 may locate a predictive block to which the motion vector points in one of the reference frame lists, retrieve the predictive block from the DPB 64, and forward the predictive block to the summer 50. The summer 50 then forms a residual video block of pixel difference values by subtracting pixel values of the predictive block provided by the motion compensation unit 44 from the pixel values of the current video block being coded. The pixel difference values forming the residual vide block may include luma or chroma difference components or both. The motion compensation unit 44 may also generate syntax elements associated with the video blocks of a video frame for use by the video decoder 30 in decoding the video blocks of the video frame. The syntax elements may include, for example, syntax elements defining the motion vector used to identify the predictive block, any flags indicating the prediction mode, or any other syntax information described herein. Note that the motion estimation unit 42 and the motion compensation unit 44 may be highly integrated, but they are illustrated separately for conceptual purposes.

In some implementations, the intra BC unit 48 may generate vectors and fetch predictive blocks in a manner similar to that described above in connection with the motion estimation unit 42 and the motion compensation unit 44, but with the predictive blocks being in the same frame as the current block being coded and with the vectors being referred to as block vectors as opposed to motion vectors. In particular, the intra BC unit 48 may determine an intra-prediction mode to use to encode a current block. In some examples, the intra BC unit 48 may encode a current block using various intra-prediction modes, e.g., during separate encoding passes, and test their performance through rate-distortion analysis. Next, the intra BC unit 48 may select, among the various tested intra-prediction modes, an appropriate intra-prediction mode to use and generate an intra-mode indicator accordingly. For example, the intra BC unit 48 may calculate rate-distortion values using a rate-distortion analysis for the various tested intra-prediction modes, and select the intra-prediction mode having the best rate-distortion characteristics among the tested modes as the appropriate intra-prediction mode to use. Rate-distortion analysis generally determines an amount of distortion (or error) between an encoded block and an original, unencoded block that was encoded to produce the encoded block, as well as a bit rate (i.e., a number of bits) used to produce the encoded block. The intra BC unit 48 may calculate ratios from the distortions and rates for the various encoded blocks to determine which intra-prediction mode exhibits the best rate-distortion value for the block.

In other examples, the intra BC unit 48 may use the motion estimation unit 42 and the motion compensation unit 44, in whole or in part, to perform such functions for intra BC prediction according to the implementations described herein. In either case, for intra block copy, a predictive block may be a block that is deemed as closely matching the block to be coded, in terms of pixel difference, which may be determined by sum of absolute difference (SAD), sum of squared difference (SSD), or other difference metrics, and identification of the predictive block may include calculation of values for sub-integer pixel positions.

Whether the predictive block is from the same frame according to the intra prediction, or a different frame according to the inter prediction, the video encoder 20 may form a residual video block by subtracting pixel values of the predictive block from the pixel values of the current video block being coded, forming pixel difference values. The pixel difference values forming the residual video block may include both luma and chroma component differences.

The intra prediction processing unit 46 may intra-predict a current video block, as an alternative to the inter-prediction performed by the motion estimation unit 42 and the motion compensation unit 44, or the intra block copy prediction performed by the intra BC unit 48, as described above. In particular, the intra prediction processing unit 46 may determine an intra prediction mode to use to encode a current block. To do so, the intra prediction processing unit 46 may encode a current block using various intra prediction modes, e.g., during separate encoding passes, and the intra prediction processing unit 46 (or a mode select unit, in some examples) may select an appropriate intra prediction mode to use from the tested intra prediction modes. The intra prediction processing unit 46 may provide information indicative of the selected intra-prediction mode for the block to the entropy encoding unit 56. The entropy encoding unit 56 may encode the information indicating the selected intra-prediction mode in the bitstream.

After the prediction processing unit 41 determines the predictive block for the current video block via either inter prediction or intra prediction, the summer 50 forms a residual video block by subtracting the predictive block from the current video block. The residual video data in the residual block may be included in one or more transform units (TUs) and is provided to the transform processing unit 52. The transform processing unit 52 transforms the residual video data into residual transform coefficients using a transform, such as a discrete cosine transform (DCT) or a conceptually similar transform.

The transform processing unit 52 may send the resulting transform coefficients to the quantization unit 54. The quantization unit 54 quantizes the transform coefficients to further reduce bit rate. The quantization process may also reduce the bit depth associated with some or all of the coefficients. The degree of quantization may be modified by adjusting a quantization parameter. In some examples, the quantization unit 54 may then perform a scan of a matrix including the quantized transform coefficients. Alternatively, the entropy encoding unit 56 may perform the scan.

Following quantization, the entropy encoding unit 56 entropy encodes the quantized transform coefficients into a video bitstream using, e.g., context adaptive variable length coding (CAVLC), context adaptive binary arithmetic coding (CABAC), syntax-based context-adaptive binary arithmetic coding (SBAC), probability interval partitioning entropy (PIPE) coding or another entropy encoding methodology or technique. The encoded bitstream may then be transmitted to the video decoder 30, or archived in the storage device 32 for later transmission to or retrieval by the video decoder 30. The entropy encoding unit 56 may also entropy encode the motion vectors and the other syntax elements for the current video frame being coded.

The inverse quantization unit 58 and the inverse transform processing unit 60 apply inverse quantization and inverse transformation, respectively, to reconstruct the residual video block in the pixel domain for generating a reference block for prediction of other video blocks. As noted above, the motion compensation unit 44 may generate a motion compensated predictive block from one or more reference blocks of the frames stored in the DPB 64. The motion compensation unit 44 may also apply one or more interpolation filters to the predictive block to calculate sub-integer pixel values for use in motion estimation.

The summer 62 adds the reconstructed residual block to the motion compensated predictive block produced by the motion compensation unit 44 to produce a reference block for storage in the DPB 64. The reference block may then be used by the intra BC unit 48, the motion estimation unit 42 and the motion compensation unit 44 as a predictive block to inter predict another video block in a subsequent video frame.

In an example of video coding using the video encoder 20, a video frame is partitioned into blocks for processing. For each given video block, a prediction is formed based on either inter prediction or intra prediction. In inter prediction, predictors or predictive blocks may be formed through motion estimation and motion compensation, based on pixels from previously reconstructed frames. In intra prediction, predictors may be formed based on reconstructed pixels in the current frame. Through mode decision, a best predictor may be chosen to predict a current block.

The prediction residual or the residual block (i.e. the difference between a current block and its predictor) is sent to a transform module, for example, the transform processing unit 52. Transform coefficients are then sent to a quantization module, e.g., the quantization unit 54, for entropy reduction. Quantized coefficients are fed to an entropy coding module, e.g., the entropy encoding unit 56, to generate compressed video bitstream. As shown in FIG. 2, prediction related information from inter and/or intra prediction modules, such as block partition information, motion vectors, reference picture index, and intra prediction mode, etc., is also going through an entropy coding module, e.g., the entropy encoding unit 56, and then saved into the bitstream.

In the video encoder 20, decoder related modules may be needed in order to reconstruct pixels for prediction purpose. First, the prediction residual is reconstructed through inverse quantization and inverse transform. The reconstructed prediction residual is then combined with the predictor to generate unfiltered reconstructed pixels for a current block.

To improve coding efficiency and visual quality, an in-loop filter 63 is commonly used. For example, a deblocking filter is available in AVC, HEVC as well as VVC. In HEVC, an additional in-loop filter called SAO (sample adaptive offset) may be defined to further improve coding efficiency. In VVC, an in-loop filter 63 called ALF (adaptive loop filter) may be employed.

These in-loop filter operations are optional. Turning on the in-loop filters usually helps improve coding efficiency and visual quality. They may also be turned-off as an encoder decision to save computation complexity.

It should be noted that intra prediction is usually based on unfiltered reconstructed pixels, while inter prediction is based on filtered reconstructed pixels if these filters are turned on by the encoder.

Figure 3:
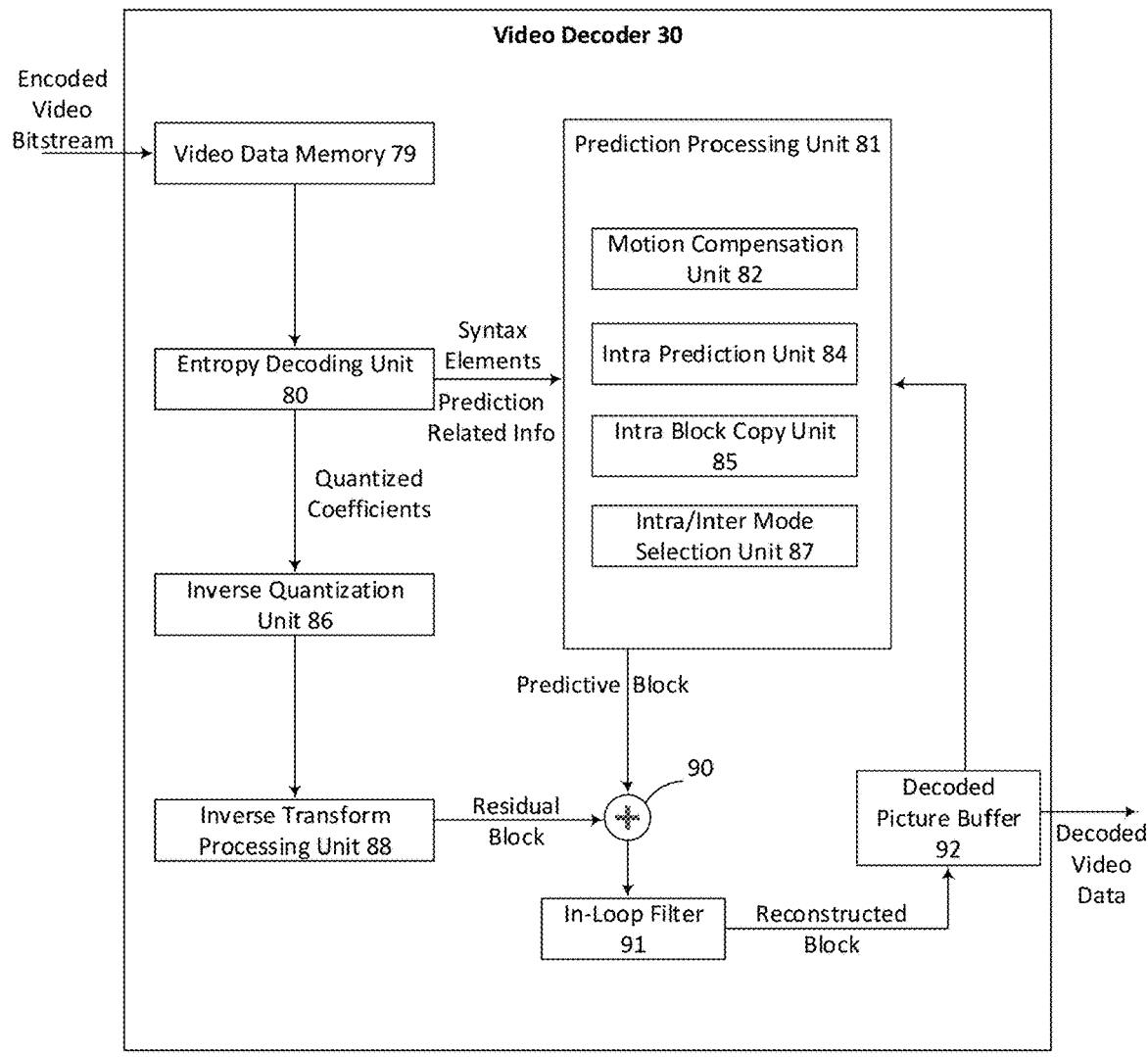
FIG. 3 is a block diagram illustrating an exemplary video decoder in accordance with some implementations of the present disclosure.

FIG. 3 is a block diagram illustrating an exemplary video decoder 30 in accordance with some implementations of the present disclosure. The video decoder 30 includes a video data memory 79, an entropy decoding unit 80, a prediction processing unit 81, an inverse quantization unit 86, an inverse transform processing unit 88, a summer 90, and a DPB 92. The prediction processing unit 81 further includes a motion compensation unit 82, an intra prediction unit 84, an intra BC unit 85, and an intra/inter mode selection unit 87. The video decoder 30 may perform a decoding process generally reciprocal to the encoding process described above with respect to the video encoder 20 in connection with FIG. 2. For example, the motion compensation unit 82 may generate prediction data based on motion vectors received from the entropy decoding unit 80, while the intra prediction unit 84 may generate prediction data based on intra-prediction mode indicators received from the entropy decoding unit 80.

In an example of video decoding using the video decoder 30, the bitstream received is decoded through the entropy decoding unit 80 to derive quantized coefficient levels (or quantized coefficients) and prediction related information. Quantized coefficient levels are then processed through the inverse quantization unit 86 and the inverse transform processing unit 88 to obtain reconstructed residual block. A predictor or predictive block is formed through either intra prediction or motion compensation process based on prediction related information decoded. The unfiltered reconstructed pixels are obtained by summing up the reconstructed residual block and the predictor. In the case that an in-loop filter is turned on, filtering operations are performed on these pixels to derive the final reconstructed video for output.

In some examples, a unit of the video decoder 30 may be tasked to perform the implementations of the present disclosure. Also, in some examples, the implementations of the present disclosure may be divided among one or more of the units of the video decoder 30. For example, the intra BC unit 85 may perform the implementations of the present disclosure, alone, or in combination with other units of the video decoder 30, such as the motion compensation unit 82, the intra prediction unit 84, and the entropy decoding unit 80. In some examples, the video decoder 30 may not include the intra BC unit 85 and the functionality of the intra BC unit 85 may be performed by other components of the prediction processing unit 81, such as the motion compensation unit 82.

The video data memory 79 may store video data, such as an encoded video bitstream, to be decoded by the other components of the video decoder 30. The video data stored in the video data memory 79 may be obtained, for example, from the storage device 32, from a local video source, such as a camera, via wired or wireless network communication of video data, or by accessing physical data storage media (e.g., a flash drive or hard disk). The video data memory 79 may include a coded picture buffer (CPB) that stores encoded video data from an encoded video bitstream. The decoded picture buffer (DPB) 92 of video decoder 30 stores reference video data for use in decoding video data by the video decoder 30 (e.g., in intra or inter predictive coding modes). The video data memory 79 and the DPB 92 may be formed by any of a variety of memory devices, such as dynamic random access memory (DRAM), including synchronous DRAM (SDRAM), magneto-resistive RAM (MRAM), resistive RAM (RRAM), or other types of memory devices. For illustrative purpose, the video data memory 79 and the DPB 92 are depicted as two distinct components of the video decoder 30 in FIG. 3. But it will be apparent to one skilled in the art that the video data memory 79 and the DPB 92 may be provided by the same memory device or separate memory devices. In some examples, the video data memory 79 may be on-chip with other components of the video decoder 30, or off-chip relative to those components.

During the decoding process, the video decoder 30 receives an encoded video bitstream that represents video blocks of an encoded video frame and associated syntax elements. The video decoder 30 may receive the syntax elements at the video frame level and/or the video block level. The entropy decoding unit 80 of the video decoder 30 entropy decodes the bitstream to generate quantized coefficients, motion vectors or intra-prediction mode indicators, and other syntax elements. The entropy decoding unit 80 then forwards the motion vectors and other syntax elements to the prediction processing unit 81.

When the video frame is coded as an intra predictive coded (I) frame or for intra coded predictive blocks in other types of frames, the intra prediction unit 84 of the prediction processing unit 81 may generate prediction data for a video block of the current video frame based on a signaled intra prediction mode and reference data from previously decoded blocks of the current frame.

When the video frame is coded as an inter-predictive coded (i.e., B or P) frame, the motion compensation unit 82 of the prediction processing unit 81 produces one or more predictive blocks for a video block of the current video frame based on the motion vectors and other syntax elements received from the entropy decoding unit 80. Each of the predictive blocks may be produced from a reference frame within one of the reference frame lists. The video decoder 30 may construct the reference frame lists, e.g., List0 and List1, using default construction techniques based on reference frames stored in the DPB 92.

In some examples, when the video block is coded according to the intra BC mode described herein, the intra BC unit 85 of the prediction processing unit 81 produces predictive blocks for the current video block based on block vectors and other syntax elements received from the entropy decoding unit 80. The predictive blocks may be within a reconstructed region of the same picture as the current video block defined by the video encoder 20.

The motion compensation unit 82 and/or the intra BC unit 85 determines prediction information for a video block of the current video frame by parsing the motion vectors and other syntax elements, and then uses the prediction information to produce the predictive blocks for the current video block being decoded. For example, the motion compensation unit 82 uses some of the received syntax elements to determine a prediction mode (e.g., intra or inter prediction) used to code video blocks of the video frame, an inter prediction frame type (e.g., B or P), construction information for one or more of the reference frame lists for the frame, motion vectors for each inter predictive encoded video block of the frame, inter prediction status for each inter predictive coded video block of the frame, and other information to decode the video blocks in the current video frame.

Similarly, the intra BC unit 85 may use some of the received syntax elements, e.g., a flag, to determine that the current video block was predicted using the intra BC mode, construction information of which video blocks of the frame are within the reconstructed region and should be stored in the DPB 92, block vectors for each intra BC predicted video block of the frame, intra BC prediction status for each intra BC predicted video block of the frame, and other information to decode the video blocks in the current video frame.

The motion compensation unit 82 may also perform interpolation using the interpolation filters as used by the video encoder 20 during encoding of the video blocks to calculate interpolated values for sub-integer pixels of reference blocks. In this case, the motion compensation unit 82 may determine the interpolation filters used by the video encoder 20 from the received syntax elements and use the interpolation filters to produce predictive blocks.

The inverse quantization unit 86 inverse quantizes the quantized transform coefficients provided in the bitstream and entropy decoded by the entropy decoding unit 80 using the same quantization parameter calculated by the video encoder 20 for each video block in the video frame to determine a degree of quantization. The inverse transform processing unit 88 applies an inverse transform, e.g., an inverse DCT, an inverse integer transform, or a conceptually similar inverse transform process, to the transform coefficients in order to reconstruct the residual blocks in the pixel domain.

After the motion compensation unit 82 or the intra BC unit 85 generates the predictive block for the current video block based on the vectors and other syntax elements, the summer 90 reconstructs decoded video block for the current video block by summing the residual block from the inverse transform processing unit 88 and a corresponding predictive block generated by the motion compensation unit 82 and the intra BC unit 85. An in-loop filter 91 may be positioned between the summer 90 and the DPB 92 to further process the decoded video block. The decoded video blocks in a given frame are then stored in the DPB 92, which stores reference frames used for subsequent motion compensation of next video blocks. The DPB 92, or a memory device separate from the DPB 92, may also store the decoded video for later presentation on a display device, such as display device 34 of FIG. 1.

In a typical video coding process, a video sequence typically includes an ordered set of frames or pictures. Each frame may include three sample arrays, denoted SL, SCb, and SCr. SL is a two-dimensional array of luma samples. SCb is a two-dimensional array of Cb chroma samples. SCr is a two-dimensional array of Cr chroma samples. In other instances, a frame may be monochrome and therefore includes only one two-dimensional array of luma samples.

Figure 4:
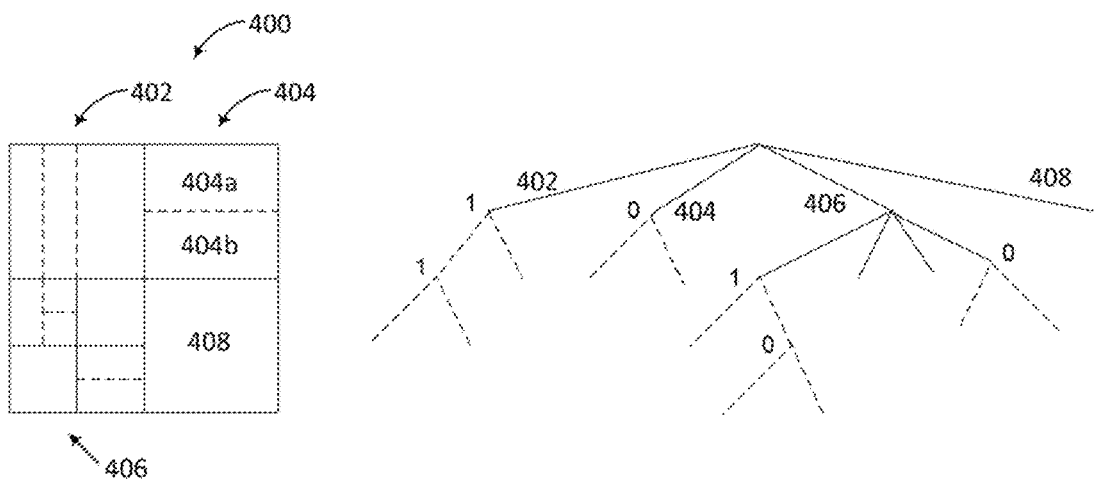
FIG. 4 is a schematic diagram illustrating a QTBT structure in accordance with some implementations of the present disclosure.

FIG. 4 is a schematic diagram illustrating a quadtree plus binary tree (QTBT) structure in accordance with some implementations of the present disclosure.

Video coding/decoding standards mentioned above, such as VVC, JEM, HEVC, MPEG-4, Part 10, are conceptually similar. For example, they all use block-based processing. Block partitioning schemes in some standards are elaborated below.

HEVC is based on a hybrid block-based motion-compensated transform coding architecture. The basic unit for compression is termed coding tree unit (CTU). The maximum CTU size is defined as up to 64 by 64 luma pixels, and two blocks of 32 by 32 chroma pixels for 4:2:0 chroma format. Each CTU may contain one coding unit (CU) or recursively split into four smaller CUs until the predefined minimum CU size is reached. Each CU (also named leaf CU) contains one or multiple prediction units (PUs) and a tree of transform units (TUs).

In general, except for monochrome content, a CTU may include one luma coding tree block (CTB) and two corresponding chroma CTBs; a CU may include one luma coding block (CB) and two corresponding chroma CBs; a PU may include one luma prediction block (PB) and two corresponding chroma PBs; and a TU may include one luma transform block (TB) and two corresponding chroma TBs. However, exceptions may occur because the minimum TB size is 4×4 for both luma and chroma (i.e., no 2×2 chroma TB is supported for 4:2:0 color format) and each intra chroma CB always has only one intra chroma PB regardless of the number of intra luma PBs in the corresponding intra luma CB.

For an intra CU, the luma CB can be predicted by one or four luma PBs, and each of the two chroma CBs is always predicted by one chroma PB, where each luma PB has one intra luma prediction mode and the two chroma PBs share one intra chroma prediction mode. Moreover, for the intra CU, the TB size cannot be larger than the PB size. In each PB, the intra prediction is applied to predict samples of each TB inside the PB from neighboring reconstructed samples of the TB. For each PB, in addition to 33 directional intra prediction modes, DC and planar modes are also supported to predict flat regions and gradually varying regions, respectively.

For each inter PU, one of three prediction modes including inter, skip, and merge, may be selected. Generally speaking, a motion vector competition (MVC) scheme is introduced to select a motion candidate from a given candidate set that includes spatial and temporal motion candidates. Multiple references to the motion estimation allow finding the best reference in 2 possible reconstructed reference picture lists (namely List 0 and List 1). For the inter mode (termed AMVP mode, where AMVP stands for advanced motion vector prediction), inter prediction indicators (List 0, List 1, or bi-directional prediction), reference indices, motion candidate indices, motion vector differences (MVDs) and prediction residual are transmitted. As for the skip mode and the merge mode, only merge indices are transmitted, and the current PU inherits the inter prediction indicator, reference indices, and motion vectors from a neighboring PU referred by the coded merge index. In the case of a skip coded CU, the residual signal is also omitted.

The Joint Exploration Test Model (JEM) is built up on top of the HEVC test model. The basic encoding and decoding flowchart of HEVC is kept unchanged in the JEM; however, the design elements of most important modules, including the modules of block structure, intra and inter prediction, residue transform, loop filter and entropy coding, are somewhat modified and additional coding tools are added. The following new coding features are included in the JEM.

In HEVC, a CTU is split into CUs by using a quadtree structure denoted as coding tree to adapt to various local characteristics. The decision whether to code a picture area using inter-picture (temporal) or intra-picture (spatial) prediction is made at the CU level. Each CU can be further split into one, two or four PUs according to the PU splitting type. Inside one PU, the same prediction process is applied and the relevant information is transmitted to the decoder on a PU basis. After obtaining the residual block by applying the prediction process based on the PU splitting type, a CU can be partitioned into transform units (TUs) according to another quadtree structure similar to the coding tree for the CU. One of key features of the HEVC structure is that it has the multiple partition conceptions including CU, PU, and TU.

The QTBT structure removes the concepts of multiple partition types, i.e., it removes the separation of the CU, PU and TU concepts, and supports more flexibility for CU partition shapes. In the QTBT block structure, a CU may have either a square or rectangular shape. As shown in FIG. 4, a coding tree unit (CTU) is first partitioned by a quaternary tree (i.e., quadtree) structure. The quadtree leaf nodes may be further partitioned by a binary tree structure. There are two splitting types in the binary tree splitting: symmetric horizontal splitting and symmetric vertical splitting. The binary tree leaf nodes are called coding units (CUs), and that segmentation is used for prediction and transform processing without any further partitioning. This means that the CU, PU and TU have the same block size in the QTBT coding block structure. In the JEM, a CU sometimes consists of coding blocks (CBs) of different colour components, e.g., one CU contains one luma CB and two chroma CBs in the case of P and B slices of the 4:2:0 chroma format, and sometimes consists of a CB of a single component, e.g., one CU contains only one luma CB or just two chroma CBs in the case of I slices.

The following parameters are defined for the QTBT partitioning scheme.
CTU size: the root node size of a quadtree, the same concept as in the HEVC;
MinQTSize: the minimum allowed quadtree leaf node size;
MaxBTSize: the maximum allowed binary tree root node size;
MaxBTDepth: the maximum allowed binary tree depth;
MinBTSize: the minimum allowed binary tree leaf node size.

In one example of the QTBT partitioning structure, the CTU size is set as 128×128 luma samples with two corresponding 64×64 blocks of chroma samples (with a 4:2:0 chroma format), the MinQTSize is set as 16×16, the MaxBTSize is set as 64×64, the MinBTSize (for both width and height) is set as 4×4, and the MaxBTDepth is set as 4. The quadtree partitioning is applied to the CTU first to generate quadtree leaf nodes. The quadtree leaf nodes may have a size from 16×16 (i.e., the MinQTSize) to 128×128 (i.e., the CTU size). If the quadtree leaf node is 128×128, it will not be further split by the binary tree since the size exceeds the MaxBTSize (i.e., 64×64). Otherwise, the quadtree leaf node could be further partitioned by the binary tree. Therefore, the quadtree leaf node is also the root node for the binary tree and it has the binary tree depth as 0. When the binary tree depth reaches MaxBTDepth (i.e., 4), no further splitting is considered. When the binary tree node has a width equal to MinBTSize (i.e., 4), no further horizontal splitting is considered. Similarly, when the binary tree node has a height equal to MinBTSize, no further vertical splitting is considered. The leaf nodes of the binary tree are further processed by prediction and transform processing without any further partitioning. In the JEM, the maximum CTU size is 256×256 luma samples.

FIG. 4 illustrates an example of block partitioning by using the QTBT scheme, and the corresponding tree representation. The solid lines indicate quadtree splitting and dotted lines indicate binary tree splitting. As shown in FIG. 4, the coding tree unit (CTU) 400 is first partitioned by a quadtree structure, and three of the four quadtree leaf nodes 402, 404, 406, 408 are further partitioned by either a quadtree structure or a binary tree structure. For example, the quadtree leaf node 406 is further partitioned by quadtree splitting; the quadtree leaf node 404 is further partitioned into two leaf nodes 404a, 404b by binary tree splitting; and the quadtree leaf node 402 is also further partitioned by binary tree splitting. In each splitting (i.e., non-leaf) node of the binary tree, one flag is signaled to indicate which splitting type (i.e., horizontal or vertical) is used, where 0 indicates horizontal splitting and 1 indicates vertical splitting. For example, for the quadtree leaf node 404, 0 is signaled to indicate horizontal splitting, and for the quadtree leaf node 402, 1 is signaled to indicate vertical splitting. For quadtree splitting, there is no need to indicate the splitting type since quadtree splitting always splits a block both horizontally and vertically to produce 4 sub-blocks with an equal size.

In addition, the QTBT scheme supports the ability for the luma and chroma to have a separate QTBT structure. Currently, for P and B slices, the luma and chroma CTBs in one CTU share the same QTBT structure. However, for I slices, the luma CTB is partitioned into luma CUs by a QTBT structure, and the chroma CTBs are partitioned into chroma CUs by another QTBT structure. This means that a CU in an I slice consists of a coding block of the luma component or coding blocks of two chroma components, and a CU in a P or B slice consists of coding blocks of all three colour components.

In a Joint Video Experts Team (WET) meeting, the JVET defined the first draft of the Versatile Video Coding (VVC) and the VVC Test Model 1 (VTM1) encoding method. It was decided to include a quadtree with nested multi-type tree using binary and ternary splits coding block structure as the initial new coding feature of VVC.

In VVC, the picture partitioning structure divides the input video into blocks called coding tree units (CTUs). A CTU is split using a quadtree with nested multi-type tree structure into coding units (CUs), with a leaf coding unit (CU) defining a region sharing the same prediction mode (e.g. intra or inter). Here, the term "unit" defines a region of an image covering all components; the term "block" is used to define a region covering a particular component (e.g. luma), and may differ in spatial location when considering the chroma sampling format such as 4:2:0.

Partitioning of the Picture into CTUs

Figure 5:
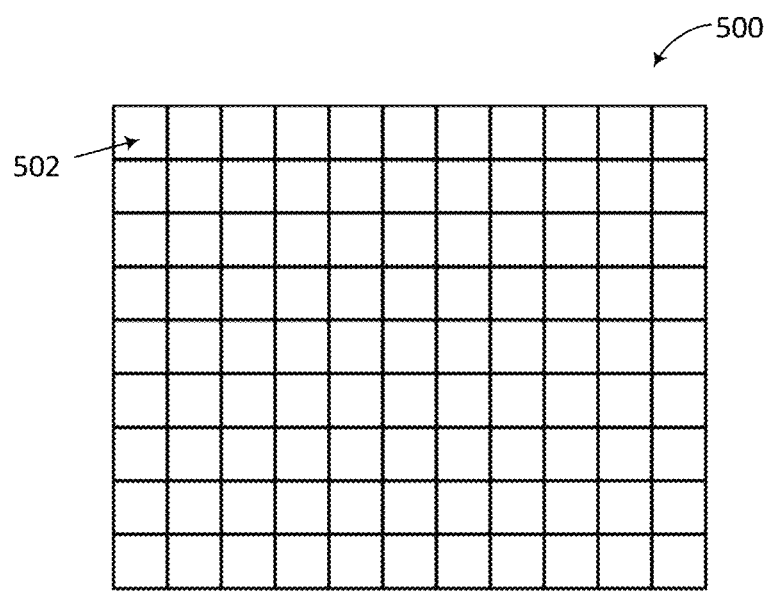
FIG. 5 is a schematic diagram illustrating an example of a picture divided into CTUs in accordance with some implementations of the present disclosure.

FIG. 5 is a schematic diagram illustrating an example of a picture divided into CTUs in accordance with some implementations of the present disclosure.

In VVC, pictures are divided into a sequence of CTUs, and the CTU concept is the same as that of the HEVC. For a picture that has three sample arrays, a CTU consists of an N×N block of luma samples together with two corresponding blocks of chroma samples. FIG. 5 shows the example of a picture 500 divided into CTUs 502.

The maximum allowed size of the luma block in a CTU is specified to be 128×128 (although the maximum size of the luma transform blocks is 64×64).

Partitioning of the CTUs Using a Tree Structure

Figure 6:
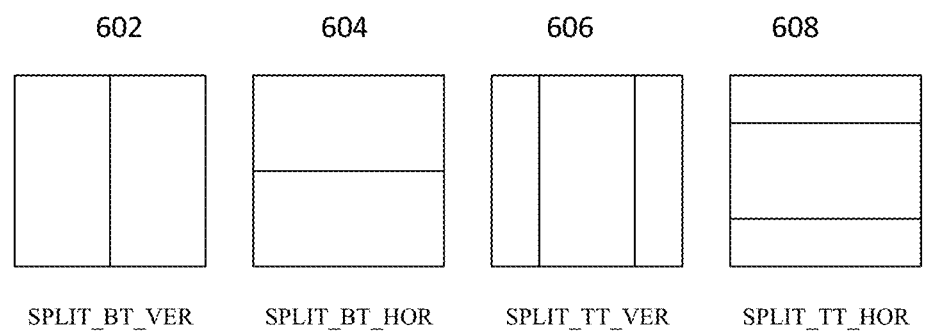
FIG. 6 is a schematic diagram illustrating multi-type tree splitting modes in accordance with some implementations of the present disclosure.

FIG. 6 is a schematic diagram illustrating multi-type tree splitting modes in accordance with some implementations of the present disclosure.

In HEVC, a CTU is split into CUs by using a quaternary-tree structure denoted as coding tree to adapt to various local characteristics. The decision whether to code a picture area using inter-picture (temporal) or intra-picture (spatial) prediction is made at the leaf CU level. Each leaf CU can be further split into one, two or four PUs according to the PU splitting type. Inside one PU, the same prediction process is applied, and the relevant information is transmitted to the decoder on a PU basis. After obtaining the residual block by applying the prediction process based on the PU splitting type, a leaf CU can be partitioned into transform units (TUs) according to another quaternary-tree structure similar to the coding tree for the CU. One of key feature of the HEVC structure is that it has the multiple partition conceptions including CU, PU, and TU.

In VVC, a quadtree with nested multi-type tree using binary and ternary splits segmentation structure replaces the concepts of multiple partition unit types, i.e. it removes the separation of the CU, PU and TU concepts except as needed for CUs that have a size too large for the maximum transform length, and supports more flexibility for CU partition shapes. In the coding tree structure, a CU may have either a square or rectangular shape. A coding tree unit (CTU) is first partitioned by a quaternary tree (i.e., quadtree) structure. Then the quaternary tree leaf nodes can be further partitioned by a multi-type tree structure. As shown in FIG. 6, there are four splitting types in multi-type tree structure: vertical binary splitting 602 (SPLIT_BT_VER), horizontal binary splitting 604 (SPLIT_BT_HOR), vertical ternary splitting 606 (SPLIT_TT_VER), and horizontal ternary splitting 608 (SPLIT_TT_HOR). The multi-type tree leaf nodes are called coding units (CUs), and unless the CU is too large for the maximum transform length, this segmentation is used for prediction and transform processing without any further partitioning. This means that, in most cases, the CU, PU and TU have the same block size in the quadtree with nested multi-type tree coding block structure. The exception occurs when the maximum supported transform length is smaller than the width or height of the color component of the CU. In VTM1, a CU consists of coding blocks (CBs) of different color components, e.g., one CU contains one luma CB and two chroma CBs (unless the video is monochrome, i.e., having only one color component).

Partitioning CUs into Multiple Prediction Units

In VVC, for each CU partitioned based on the structure illustrated above, prediction of the block content can be performed either on the whole CU block or in a sub-block manner explained in the following paragraphs. The operation unit of such prediction is called prediction unit (or PU).

In the case of intra prediction (or intra-frame prediction), usually the size of the PU is equal to the size of the CU. In other words, the prediction is performed on the whole CU block. For inter prediction (or inter-frame prediction), the size of the PU can be equal or less than the size of the CU. In other words, there are cases where a CU may be split into multiple PUs for prediction.

Some examples of having the PU size smaller than the CU size include an affine prediction mode, an Advanced Temporal Level Motion Vector Prediction (ATMVP) mode, and a triangle prediction mode, etc.

Under the affine prediction mode, a CU may be split into multiple 4×4 PUs for prediction. Motion vectors can be derived for each 4×4 PU and motion compensation can be performed accordingly on the 4×4 PU. Under the ATMVP mode, a CU may be split into one or multiple 8×8 PUs for prediction. Motion vectors are derived for each 8×8 PU and motion compensation can be performed accordingly on the 8×8 PU. Under the triangle prediction mode, a CU may be split into two triangular shape prediction units. Motion vectors are derived for each PU and motion compensation is performed accordingly. The triangle prediction mode is supported for inter prediction. More details of the triangle prediction mode are illustrated below.

Triangle Prediction Mode

Figure 7:
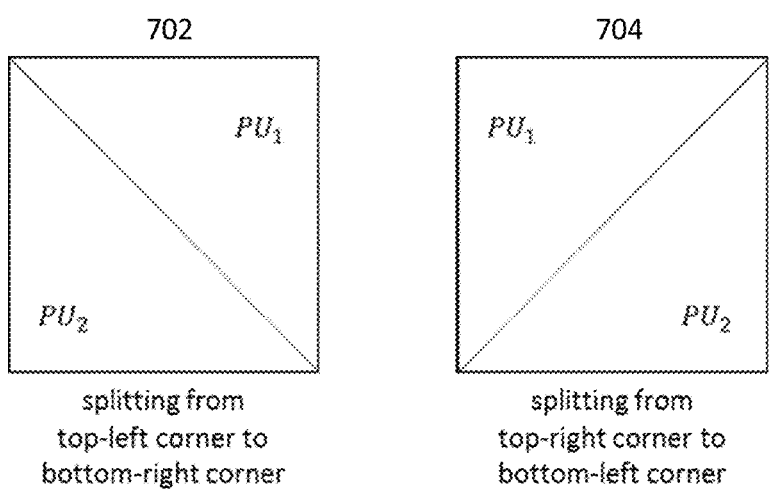
FIG. 7 is a schematic diagram illustrating splitting a CU into triangular prediction units in accordance with some implementations of the present disclosure.

FIG. 7 is a schematic diagram illustrating splitting a CU into triangular prediction units in accordance with some implementations of the present disclosure.

The concept of the triangle prediction mode is to introduce triangular partitions for motion compensated prediction. As shown in FIG. 7, a CU 702, 704 is split into two triangular prediction units $PU_1$ and $PU_2$, in either the diagonal or the inverse diagonal direction (i.e., either splitting from top-left corner to bottom-right corner or splitting from top-right corner to bottom-left corner). Each triangular prediction unit in the CU is inter-predicted using its own uni-prediction motion vector and reference frame index which are derived from a uni-prediction candidate list. An adaptive weighting process is performed to the diagonal edge after predicting the triangular prediction units. Then, the transform and quantization process are applied to the whole CU. It is noted that this mode is only applied to skip and merge modes in the current VVC. Although in FIG. 7, the CU is shown as a square block, the triangle prediction mode may be applied to non-square (i.e. rectangular) shape CUs as well.

The uni-prediction candidate list may comprise one or more candidates, and each candidate may be a motion vector. Thus, throughout this disclosure, the terms "uni-prediction candidate list," "uni-prediction motion vector candidate list," and "uni-prediction merge list" may be used interchangeably.

Uni-Prediction Motion Vector Candidate List

Figure 8:
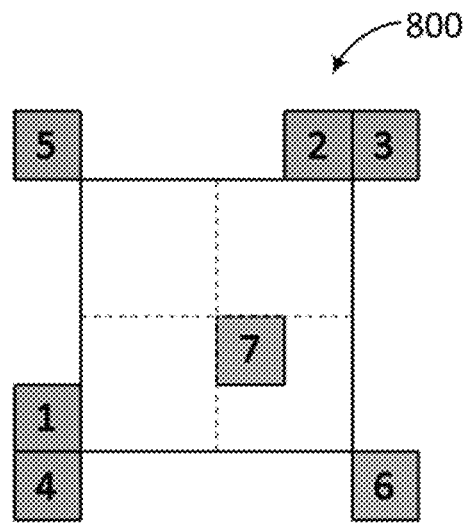
FIG. 8 is a schematic diagram illustrating positions of neighboring blocks in accordance with some implementations of the present disclosure.

FIG. 8 is a schematic diagram illustrating positions of the neighboring blocks in accordance with some implementations of the present disclosure.

In some examples, the uni-prediction motion vector candidate list may include two to five uni-prediction motion vector candidates. In some other examples, other number may also be possible. It is derived from neighboring blocks. The uni-prediction motion vector candidate list is derived from seven neighboring blocks including five spatial neighboring blocks (1 to 5) and two temporal co-located blocks (6 to 7), as shown in FIG. 8. The motion vectors of the seven neighboring blocks are collected into a first merge list. Then, a uni-prediction candidate list is formed based on the first merge list motion vectors according to a specific order. Based on the order, the uni-prediction motion vectors from the first merge list are put in the uni-prediction motion vector candidate list first, followed by reference picture List 0 or L0 motion vector of bi-prediction motion vectors, and then reference picture List 1 or L1 motion vector of bi-prediction motion vectors, and then followed by the averaged motion vector of the L0 and L1 motion vectors of bi-prediction motion vectors. At that point, if the number of candidates is still less than a target number (which is five in the current VVC), zero motion vectors are added to the list to meet the target number.

A predictor is derived for each of the triangular PUs based on its motion vector. It is worth noting that the predictor derived covers a larger area than the actual triangular PU so that there is an overlapped area of the two predictors along the shared diagonal edge of the two triangular PUs. An adaptive weighting process is applied to the diagonal edge area between the two predictors to derive a final prediction for the CU. Two sets of weighting factors are currently used as follows:

1st weighting factor set: {7/8, 6/8, 4/8, 2/8, 1/8} and {7/8, 4/8, 1/8} are used for the luminance and the chrominance samples, respectively;

2nd weighting factor set: {7/8, 6/8, 5/8, 4/8, 3/8, 2/8, 1/8} and {6/8, 4/8, 2/8} are used for the luminance and the chrominance samples, respectively.

Figure 9:
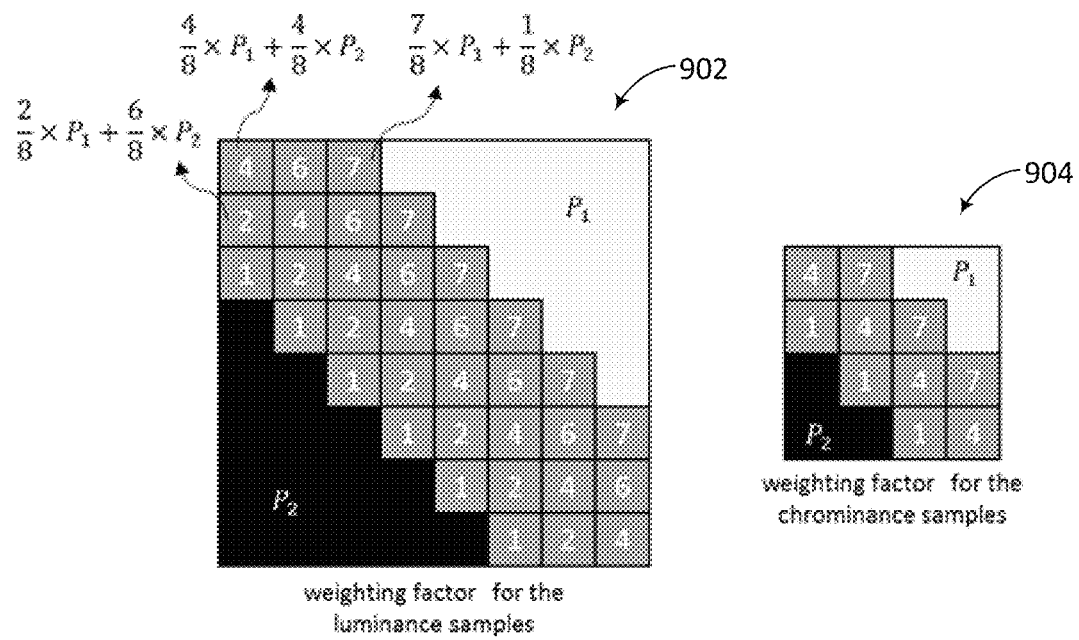
FIG. 9 is a schematic diagram illustrating an example of weighting with a weighting factor set in accordance with some implementations of the present disclosure.

Selection of the weighting factor set is based on the comparison of the motion vectors of the two triangular prediction units. More specifically, the 2nd weighting factor set is used when the reference pictures of the two triangular prediction units are different from each other or their motion vector difference is larger than 16 pixels. Otherwise, the 1st weighting factor set is used. FIG. 9 shows an example of weighting with a weighting factor set in accordance with some implementations of the present disclosure. In FIG. 9, the 1st weighting factor set is used for the luminance samples 902 and the chrominance samples 904.

Triangle Prediction Mode Syntax and Signaling

In the current VVC, the triangle prediction mode is signaled using a triangle prediction flag. This flag is signaled when a CU is coded in either skip mode or merge mode. For a given CU, if the flag has a value of 1, it means that the corresponding CU is coded using the triangle prediction mode. Otherwise, the CU is coded using a prediction mode other than the triangle prediction mode.

According to the current VVC standard draft, the triangle prediction flag is conditionally signaled in either skip mode or merge mode. Firstly, a triangle prediction tool enable/disable flag is signaled in sequence parameter set (or SPS). Only if this flag is true, the triangle prediction flag is signaled at the CU level. Secondly, the triangle prediction tool is only allowed in B slices. Thus, only in a B slice, the triangle prediction flag is signaled at the CU level. Thirdly, the triangle prediction mode is signaled only for a CU with a size equal or larger than a certain threshold. If a CU has a size smaller than that threshold, the triangle prediction flag is not signaled. Fourthly, the triangle prediction flag is only signaled for a CU if that CU is not coded in the sub-block merge mode which includes both the affine prediction mode and the ATMVP mode. In the four cases listed above, if the triangle prediction flag is not signaled, it is inferred as 0 at the decoder side. In some examples, the triangle prediction flag is not explicitly signaled in the bitstream. Instead, the triangle prediction mode is inferred as enabled when all the other merge related modes are signaled as disabled.

According to the current VVC standard draft, when the triangle prediction flag is signaled, it is signaled using a CABAC entropy coder with certain contexts. The contexts are formed based on the triangle prediction flag values from neighboring blocks, as exemplified in FIG. 10 which illustrates context derivation for coding the triangle prediction flag in accordance with some implementations of the present disclosure.

Figure 10:
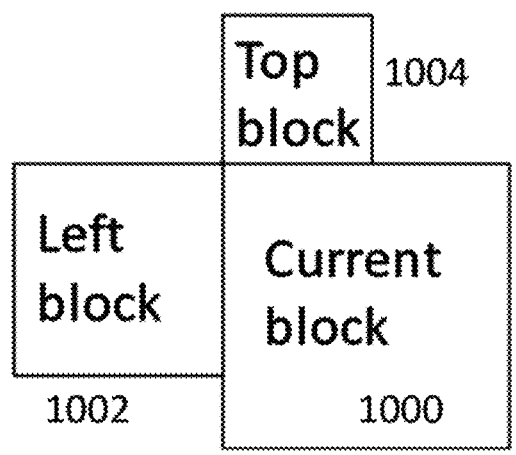
FIG. 10 is a schematic diagram illustrating context derivation for coding a triangle prediction flag in accordance with some implementations of the present disclosure.

As shown in FIG. 10, to code (i.e. either encode or decode) a triangle prediction flag for a current block 1000 (or a current CU), the triangle prediction flags from both the top block 1004 and the left block 1002 (or the top and the left CUs) are derived and their values are summed up. This results in three possible contexts corresponding to the following cases:

1) Both the left block and the top block have a triangle prediction flag of 0;
2) Both the left block and the top block have a triangle prediction flag of 1;
3) Otherwise.

Separate probabilities are maintained for each of the three contexts. Once a context value is determined for a current block, the triangle prediction flag of the current block is coded using the CABAC probability model corresponding to that context value.

If the triangle prediction flag is true, a table index value related to the triangle prediction mode is further signaled. This index value can be used to derive the following information:

1) the triangle prediction partition orientation, i.e. whether the block is partitioned from the top-left corner to bottom-right corner, or from the top-right corner to bottom-left corner; and 2) a motion vector in the uni-prediction motion vector candidate list for each of the two partitions.

More specifically, this is achieved through a table lookup operation, e.g., with a triangle prediction merge list index signaling table as shown in Table 1. In the current VVC reference software VTM, this table, which is an array of size 40 by 3, is defined as follows.

TABLE 1

Triangle prediction merge list index signaling table g_triangleCombination[40][3] = {
{ 0, 1, 0 }, { 1, 0, 1 }, { 1, 0, 2 }, { 0, 0, 1 }, { 0, 2, 0 },
{ 1, 0, 3 }, { 1, 0, 4 }, { 1, 1, 0 }, { 0, 3, 0 }, { 0, 4, 0 },
{ 0, 0, 2 }, { 0, 1, 2 }, { 1, 1, 2 }, { 0, 0, 4 }, { 0, 0, 3 },
{ 0, 1, 3 }, { 0, 1, 4 }, { 1, 1, 4 }, { 1, 1, 3 }, { 1, 2, 1 },
{ 1, 2, 0 }, { 0, 2, 1 }, { 0, 4, 3 }, { 1, 3, 0 }, { 1, 3, 2 },
{ 1, 3, 4 }, { 1, 4, 0 }, { 1, 3, 1 }, { 1, 2, 3 }, { 1, 4, 1 },
{ 0, 4, 1 }, { 0, 2, 3 }, { 1, 4, 2 }, { 0, 3, 2 }, { 1, 4, 3 },
{ 0, 3, 1 }, { 0, 2, 4 }, { 1, 2, 4 }, { 0, 4, 2 }, { 0, 3, 4 },
};

This 2-dimensional array has 40 rows and 3 columns. The values of the first column indicate the partition orientation, with 0 indicating one partition orientation and 1 indicating the other partition orientation. The values of the second and third column are index values pointing to the corresponding uni-prediction motion vectors in the uni-prediction motion vector candidate list, for each of the two partitions, e.g., the two triangular partitions, respectively. As illustrated earlier, according to the current VVC standard draft, the uni-prediction motion vector candidate list includes two to five uni-prediction motion vectors. The index values indicate which motion vector in this list is to be used for the corresponding triangular partition.

Under the triangle prediction mode, the table index value signaled ranges from 0 to 39. Once the index value is decoded, it can be used to look up a row of data including three numbers according to the table above. These three numbers indicate the triangle prediction partition orientation and a merge list index value of the uni-prediction merge list for each of the two motion vectors of the triangular partitions.

Figure 11:
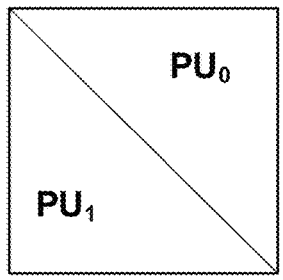
FIG. 11 is a schematic diagram illustrating examples of PU partitions in accordance with some implementations of the present disclosure.
Figure 11:
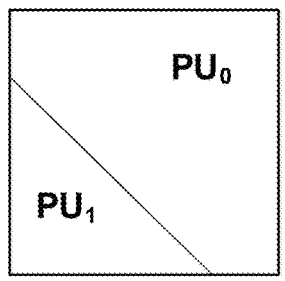
Figure 11:
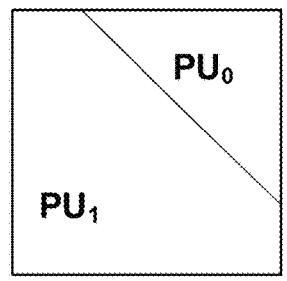
Figure 11:
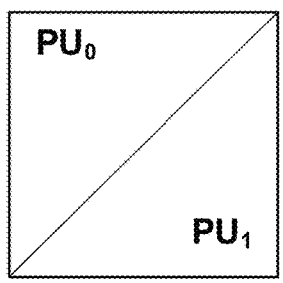
Figure 11:
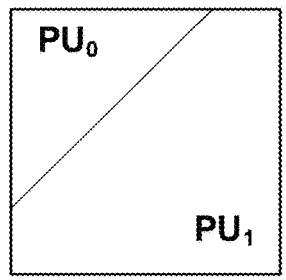
Figure 11:
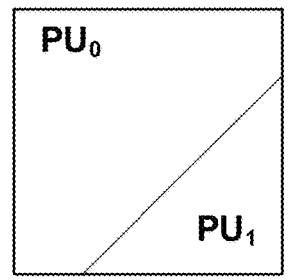
Figure 11:
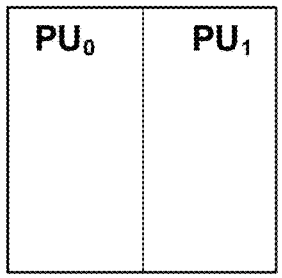
Figure 11:
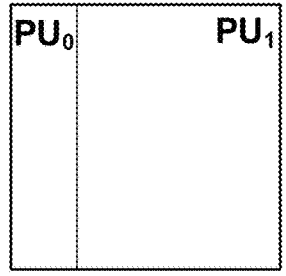
Figure 11:
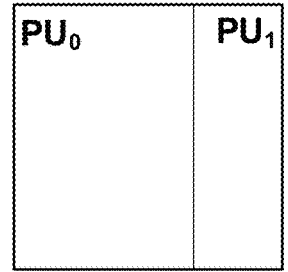
Figure 11:
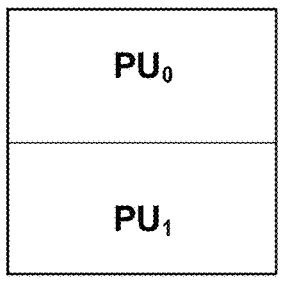
Figure 11:
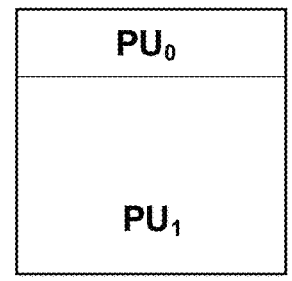
Figure 11:
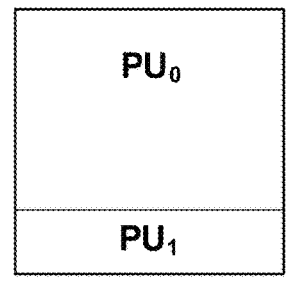

In the current VVC standard draft, to extend and/or simplify the triangle prediction mode, the idea of the triangular PU is extended to other partitions of prediction units, as shown in FIG. 11 which illustrates examples of PU partitions in accordance with some implementations of the present disclosure. In addition to the two diagonal triangular PU partitions, the method or concept used in the triangle prediction mode may be applied to other PU partitions. Basically, given a type of partition shown in FIG. 11, two uni-directional predictors are derived for each partition (e.g., PU0 and PU1), and adaptive weighting is applied around the border area of the two partitions. For example, the method used for triangular PUs may be applied to horizontal and/or vertical PUs.

Regular Merge Mode Motion Vector Candidate List

According to the current VVC, under the regular merge mode where a whole CU is predicted without splitting into more than one PU, the motion vector candidate list or the merge candidate list is constructed using a different procedure than that for the triangle prediction mode.

Figure 12:
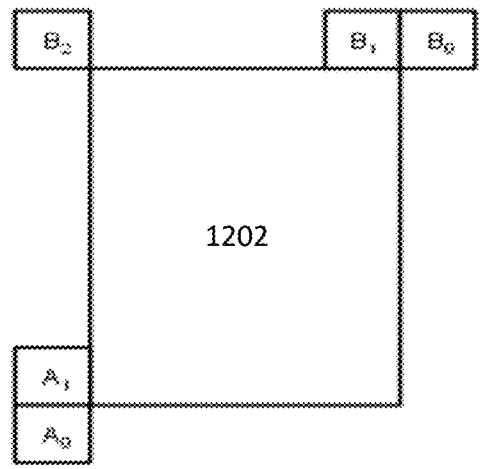
FIG. 12 is a schematic diagram illustrating positions of spatial merge candidates in accordance with some implementations of the present disclosure.

Firstly, spatial motion vector candidates are selected based on motion vectors from neighboring blocks as indicated in FIG. 12, which is a schematic diagram illustrating positions of spatial merge candidates in accordance with some implementations of the present disclosure. In the derivation of spatial merge candidates, a maximum of four merge candidates are selected among candidates that are located in positions as depicted in FIG. 12. The order of derivation is $A_1 \rightarrow B_1 \rightarrow B_0 \rightarrow A_0 \rightarrow (B_2)$. The position B2 is considered only when any PU of positions $A_1$, $B_1$, $B_0$, $A_0$ is not available or is intra coded.

Figure 13:
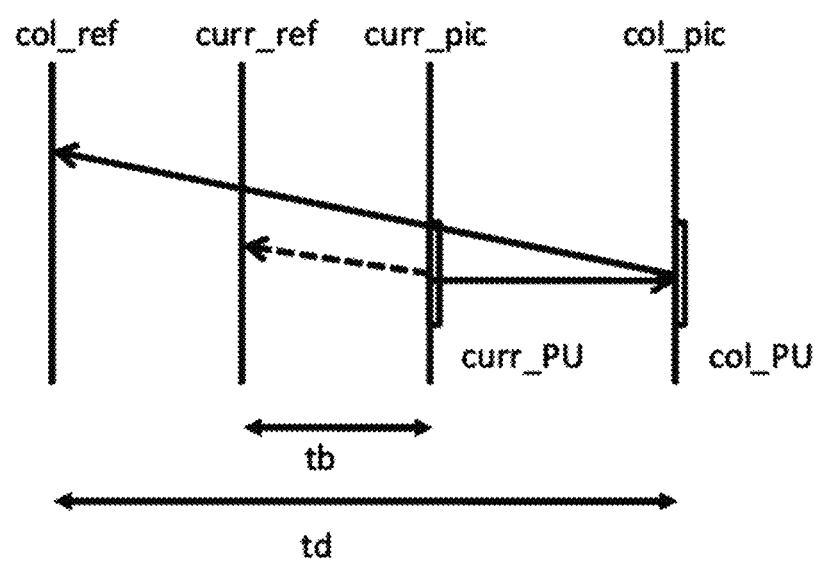
FIG. 13 is a schematic diagram illustrating motion vector scaling for a temporal merge candidate in accordance with some implementations of the present disclosure.

Next, a temporal merge candidate is derived. In the derivation of the temporal merge candidate, a scaled motion vector is derived based on the co-located PU belonging to the picture which has the smallest Picture Order Count (POC) difference with the current picture within the given reference picture list. The reference picture list to be used for derivation of the co-located PU is explicitly signaled in the slice header. The scaled motion vector for the temporal merge candidate is obtained as illustrated by the dotted line in FIG. 13 which illustrates motion vector scaling for the temporal merge candidate in accordance with some implementations of the present disclosure. The scaled motion vector for the temporal merge candidate is scaled from the motion vector of the co-located PU col_PU using the POC distances, tb and td, where tb is defined to be the POC difference between the reference picture of the current picture curr_ref and the current picture curr_pic and td is defined to be the POC difference between the reference picture of the co-located picture col_ref and the co-located picture col_pic. The reference picture index of the temporal merge candidate is set equal to zero. A practical realization of the scaling process is described in the HEVC draft specification. For a B-slice, two motion vectors, one for reference picture List 0 and the other for reference picture List 1, are obtained and combined to make the bi-predictive merge candidate.

Figure 14:
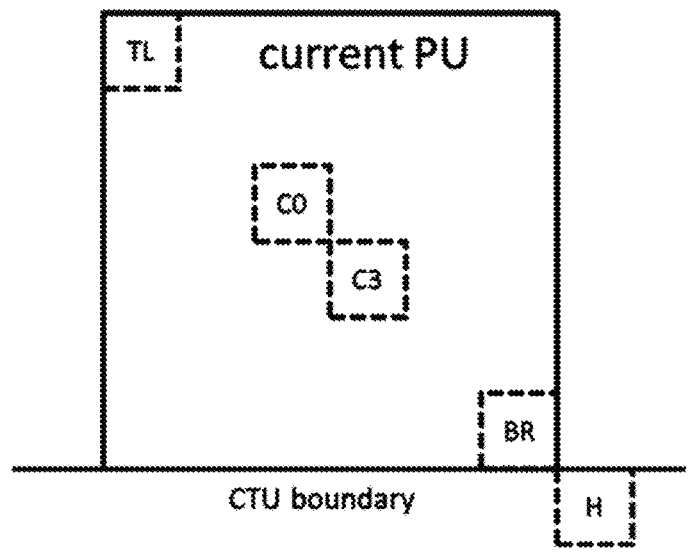
FIG. 14 is a schematic diagram illustrating candidate position for a temporal merge candidate in accordance with some implementations of the present disclosure.

FIG. 14 is a schematic diagram illustrating candidate positions for the temporal merge candidate in accordance with some implementations of the present disclosure.

The position of co-located PU is selected between two candidate positions, C3 and H, as depicted in FIG. 14. If the PU at position H is not available, or is intra coded, or is outside of the current CTU, position C3 is used for the derivation of the temporal merge candidate. Otherwise, position H is used for the derivation of the temporal merge candidate.

After inserting both spatial and temporal motion vectors into the merge candidate list as described above, history-based merge candidates are added. The so-called history-based merge candidates include those motion vectors from previously coded CUs, which are maintained in a separate motion vector list, and managed based on certain rules.

After inserting history-based candidates, if the merge candidate list is not full, pairwise average motion vector candidates are further added into the list. As its name indicates, this type of candidates is constructed by averaging candidates already in the current list. More specifically, based on a certain order, two candidates in the merge candidate list are taken each time and the average motion vector of the two candidates is appended to the current list.

According to the current VVC, the following motion vector paring order is used to determine which two candidates in the list are taken each time to derive an average motion vector candidate:

$$\{0,1\} \rightarrow \{0,2\} \rightarrow \{1,2\} \rightarrow \{0,3\} \rightarrow \{1,3\} \rightarrow \{2,3\}.$$

The two values in each pair of braces represent the two index values of motion vector candidates in the merge candidate list. Thus, the first average motion vector candidate is generated by averaging motion vector candidate 0 and motion vector candidate 1 in the merge candidate list. The second average motion vector candidate is generated by averaging motion vector candidate 0 and motion vector candidate 2 in the merge candidate list, and so on.

After inserting pairwise average motion vectors, if the merge candidate list is still not full, zero motion vectors will be added to make the list full.

Merge Mode with Motion Vector Difference (MMVD)/Ultimate Motion Vector Expression (UMVE)

Ultimate motion vector expression (UMVE) is adopted in the VVC and has been integrated into the reference software VTM. The UMVE is later renamed as merge mode with MVD (MMVD). MMVD is used for either skip mode or merge mode with a proposed motion vector expression method.

MMVD re-uses merge candidates in a same manner as in the VVC. Among the merge candidates, a candidate can be selected, and is further expanded by the proposed motion vector expression method.

MMVD provides a new motion vector expression with simplified signaling. The expression method includes a starting point, a motion magnitude, and a motion direction.

The proposed technique uses a merge candidate list as it is. But only candidates which are of default merge type (MRG_TYPE_DEFAULT_N) are considered for MMVD's expansion.

A base candidate index (IDX) defines the starting point. The base candidate index indicates the best candidate among candidates in the table below.

TABLE 2

| Base candidate IDX | | | | |
|---|---|---|---|---|
| Base candidate IDX | | | | |
| | 0 | 1 | 2 | 3 |
| $N^{th}$ MVP | $1^{st}$ MVP | $2^{nd}$ MVP | $3^{rd}$ MVP | $4^{th}$ MVP |

If the number of base candidates is equal to 1, the base candidate IDX is not signaled.

A distance index is the motion magnitude information. The distance index indicates the pre-defined distance from the starting point. The pre-defined distance is as follows:

TABLE 3

| | Distance IDX | | | | | | | |
|---|---|---|---|---|---|---|---|---|
| | Distance IDX | | | | | | | |
| | 0 | 1 | 2 | 3 | 4 | 5 | 6 | 7 |
| Pixel distance | 1/4-pel | 1/2-pel | 1-pel | 2-pel | 4-pel | 8-pel | 16-pel | 32-pel |

A direction index represents the direction of the MVD relative to the starting point. The direction index can represent the four directions as shown in the table below.

TABLE 4

| | Direction IDX | | | |
|---|---|---|---|---|
| | 00 | 01 | 10 | 11 |
| x-axis | + | − | N/A | N/A |
| y-axis | N/A | N/A | + | − |

A MMVD flag is signaled right after sending a skip flag and merge flag. If the skip and merge flag is true, the MMVD flag is parsed. If the MMVD flag is equal to 1, MMVD syntaxes are parsed; otherwise, an AFFINE flag is parsed. If the AFFINE flag is equal to 1, AFFINE mode is indicated; otherwise, skip/merge index is parsed for VTM's skip/merge mode.

Combined Inter and Intra Prediction (CIIP)

In VTM, when a CU is coded in the merge mode, if the CU contains at least 64 luma samples (that is, the CU width times the CU height is equal to or larger than 64), an additional flag is signaled to indicate whether the combined inter/intra prediction (CIIP) mode is applied to the current CU.

In order to form the CIIP, an intra prediction mode is first derived from two additional syntax elements. Up to four possible intra prediction modes can be used: DC, planar, horizontal, or vertical. Then, the inter prediction and intra prediction signals are derived using regular intra and inter decoding processes. Finally, weighted averaging of the inter and intra prediction signals is performed to obtain the CIIP prediction.

In the intra prediction mode derivation, up to 4 intra prediction modes, including DC, PLANAR, HORIZONTAL, and VERTICAL modes, can be used to predict the luma component in the CIIP mode. If the CU shape is very wide (that is, its width is more than two times of its height), the HORIZONTAL mode is not allowed. If the CU shape is very narrow (that is, its height is more than two times of its width), the VERTICAL mode is not allowed. In these cases, only 3 intra prediction modes are allowed.

The CIIP mode uses 3 most probable modes (MPM) for intra prediction. The CIIP MPM candidate list is formed as follows:

The left and top neighboring blocks are set as A and B, respectively;

The intra prediction modes of block A and block B, denoted as intraModeA and intraModeB, respectively, are derived as follows:
  i. Let X be either A or B;
  ii. intraModeX is set to DC if 1) block X is not available; or 2) block X is not predicted using the CIIP mode or the intra mode; 3) block X is outside of the current CTU;
  iii. otherwise, intraModeX is set to 1) DC or PLANAR if the intra prediction mode of block X is DC or PLANAR; or 2) VERTICAL if the intra prediction mode of block X is a "vertical-like" angular mode (larger than 34), or 3) HORIZONTAL if the intra prediction mode of block X is a "horizontal-like" angular mode (smaller than or equal to 34);

If intraModeA and intraModeB are the same:
  i. If intraModeA is PLANAR or DC, then the three MPMs are set to {PLANAR, DC, VERTICAL} in that order;
  ii. Otherwise, the three MPMs are set to {intraModeA, PLANAR, DC} in that order;

Otherwise (intraModeA and intraModeB are different):
  i. The first two MPMs are set to {intraModeA, intraModeB} in that order;
  ii. Uniqueness of PLANAR, DC and VERTICAL is checked in that order against the first two MPM candidate modes; as soon as a unique mode is found, it is added to as the third MPM.

If the CU shape is very wide or very narrow as defined above, an MPM flag is inferred to be 1 without signaling. Otherwise, the MPM flag is signaled to indicate if the CIIP intra prediction mode is one of the CIIP MPM candidate modes.

If the MPM flag is 1, an MPM index is further signaled to indicate which one of the MPM candidate modes is used in the CIIP intra prediction. Otherwise, if the MPM flag is 0, the intra prediction mode is set to the "missing" mode in the MPM candidate list. For example, if the PLANAR mode is not in the MPM candidate list, the PLANAR mode is the missing mode, and the intra prediction mode is set to PLANAR. Since 4 possible intra prediction modes are allowed in the CIIP, and the MPM candidate list contains only 3 intra prediction modes, one of the 4 possible modes must be the missing mode.

For the chroma components, the DM mode is always applied without additional signaling; that is, chroma uses the same prediction mode as luma. In this example, the chroma intra prediction mode directly reuses the intra prediction mode for the luma component. It is thus named derived mode, or DM mode.

The intra prediction mode of a CIIP-coded CU will be saved and used in the intra mode coding of the future neighboring CUs.

To combine the inter and intra prediction signals, the inter prediction signal in the CIIP mode P_inter is derived using the same inter prediction process applied to the regular merge mode; and the intra prediction signal P_intra is derived using the CIIP intra prediction mode following the regular intra prediction process. Then, the intra and inter prediction signals are combined using weighted averaging, where the weight value depends on the intra prediction mode and where the sample is located in the coding block, as follows:

If the intra prediction mode is the DC or planar mode, or if the block width or height is smaller than 4, equal weights are applied to the intra prediction and the inter prediction signals.

Otherwise, the weights are determined based on the intra prediction mode (either horizontal mode or vertical mode in this case) and the sample location in the block. Taking the horizontal prediction mode for example (the weights for the vertical mode are derived similarly but in the orthogonal direction) and denoting W as the width of the block and H as the height of the block, the coding block is first split into four equal-area parts, each having a dimension of (W/4)×H. Starting from the part closest to the intra prediction reference samples and ending at the part farthest away from the intra prediction reference samples, the weight wt for each of the four parts or regions is set to 6, 5, 3, and 2, respectively. The final CIIP prediction signal is derived using the following equation:

$$P_{CIIP} = ((8-wt)*P_{inter} + wt*P_{intra}) >> 3.$$

As previously described, the triangle prediction merge list indexes are signaled based on a pre-defined Table 1 of size 40×3. The first column of the table indicates the triangle partition orientation, and the second and third columns indicate the index values of the motion vector candidates in the uni-prediction motion vector candidate list for each of the two triangle prediction units of a CU. The table needs to be stored at both the encoder and the decoder ends. In some examples of the present disclosure, it is proposed that the size of the table may be reduced.

Separate Signaling of Triangle Partition Orientation and Merge List Indexes

The current Table 1 defined in VVC for triangle prediction merge list index signaling may be derived through data training. In this table, the triangle partition orientation and the merge list indexes are grouped together for signaling. Theoretically, it may be unlikely that one triangle partition orientation always has a higher chance to be used than the other triangle partition orientation. Therefore, based on the present disclosure, the signaling of the triangle partition orientation may be decoupled from the merge list index signaling.

More specifically, according to the present disclosure, under the triangle prediction mode, a separate flag, named a partition orientation flag or a triangle partition orientation flag for example, may be signaled to indicate which of the two triangle partition orientations is used. The two merge list index values indicating selected entries in the uni-prediction merge list or the uni-prediction motion vector candidate list, one for each triangular partition, are signaled together as a table index value.

For example, the following Table 5, having a dimension of 20×2, may be used for signaling of the merge list index values of the two triangle prediction units. In this case, a table index value ranging from 0 to 19 may be signaled to indicate which merge list index values are used for the two triangular partitions, respectively.

TABLE 2

Simplified triangle prediction
merge list index signaling g_triangleCombination[20][2] = {
　{ 0, 1 }, { 1, 0 }, { 0, 2 }, { 2, 0 }, { 1, 2 },
　{ 2, 1 }, { 0, 3 }, { 3, 0 }, { 1, 3 }, { 3, 1 },
　{ 0, 4 }, { 4, 0 }, { 2, 3 }, { 3, 2 }, { 1, 4 },
　{ 4, 1 }, { 2, 4 }, { 4, 2 }, { 3, 4 }, { 4, 3 }
};

It should be noted that the table above shows just one example. Other combination order may be used.

It should be also noted that the signaling order of the triangle partition orientation flag and the table index value (which represents a merge list index combination) may also vary. In other words, the triangle partition orientation flag may be signaled before the table index value, or after the table index value.

According to another example of the present disclosure, the triangle partition orientation flag may be simply coded with an assumption that the flag has equal probabilities (i.e. 50% probability) of having a value of 0 and having a value of 1. In other words, the flag may be always coded as CABAC bypass bin.

Accordingly, in some examples, the method includes: partitioning video pictures into a plurality of coding units (CUs), at least one of which is further portioned into two prediction units (PUs) including at least one triangular shaped PU with a partitioning orientation in one of: from top-left corner to bottom-right corner, and from top-right corner to bottom-left corner; constructing a uni-prediction motion vector candidate list; determining whether a current CU is coded as triangle prediction mode according to coded information; signaling a partition orientation flag indicating the partitioning orientation; and signaling index values that indicate selected entries in the constructed uni-prediction motion vector candidate list.

Separate Signaling of Merge Index Value and Partition Mapping

To further reduce memory requirement, according to another example of the present disclosure, under the triangle prediction mode, an additional flag, named a mapping flag for example, may be signaled to indicate how the index values are assigned to the two triangular partitions, or a mapping scheme between the two index values and the two triangular partitions.

More specifically, the method is based on the fact that some symmetry exists in the data shown in Table 5. For example, considering the first two rows of {0, 1} and {1, 0} in the table, they represent the same two motion vectors in the uni-prediction merge list being assigned to the two triangular partitions, but with different correspondences. {0, 1} indicates that the first motion vector candidate in the merge list is assigned to the first partition and the second motion vector candidate in that merge list is assigned to the second partition. {1, 0} indicates that the second motion vector candidate in the merge list is assigned to the first partition and the first motion vector candidate in that list is assigned to the second partition. According to some examples of the present disclosure, these two cases can be both signaled using {0, 1}, together with a mapping flag signaled to differentiate between the two cases.

TABLE 3

Further simplified triangle prediction
merge list index signaling g_triangleCombination[10][2] = {
　{ 0, 1 }, { 0, 2 }, { 1, 2 }, { 0, 3 }, { 1, 3 },
　{ 0, 4 }, { 2, 3 }, { 1, 4 }, { 2, 4 }, { 3, 4 },
};

Based on the illustrations above, the table may be further simplified as Table 6, having a dimension of 10×2. In this case, a table index value ranging from 0 to 9 is signaled to indicate which merge list index values are used for the two triangular partitions. A mapping flag is signaled together with the table index value. For example, if the table index value of 0 is signaled, it indicates {0, 1} which means that the first and the second motion vector candidates in the merge list are used. If the mapping flag is 0, it may indicate that the first motion vector candidate in the merge list is assigned to the first partition and the second motion vector candidate in that list is assigned to the second partition. Otherwise, if the mapping flag is 1, it may indicate that the second motion vector candidate in the merge list is assigned to the first partition and the first motion vector candidate in that list is assigned to the second partition.

It should be noted that the table above shows just one example. Other combination order may be used.

It should be also noted that the signaling order of the mapping flag and the table index value (which represents a merge list index combination) may also vary. In other words, the mapping flag may be signaled before the table index value, or after the table index value.

According to another example of the present disclosure, the mapping flag may be simply coded with an assumption that the flag has equal probabilities (i.e. 50% probability) of having a value of 0 and having a value of 1. In other words, the flag may be always coded as CABAC bypass bin.

Sharing the Merge List Index Combination Table with Pairwise Average Motion Vector As previously explained, during the regular merge mode motion vector candidate list generation process, a motion vector pairing order is used in generating pairwise average motion vectors. The motion vector pairing order shown in the example is:

{0,1}→{0,2}→{1,2}→{0,3}→{1,3}→{2,3}.

According to another example of the present disclosure, only one table may be defined and the table may be shared for both a) the regular mode pairwise averaging motion vector generation, and b) the triangle prediction mode merge list index signaling.

For example, Table 6 may be further modified as Table 7 below so that it may be also used for regular mode pairwise averaging motion vector generation.

TABLE 4

Shared index combination

```
g_triangleCombination[10][2] = {
    { 0, 1 }, { 0, 2 }, { 1, 2 }, { 0, 3 }, { 1, 3 },
    { 2, 3 }, { 0, 4 }, { 1, 4 }, { 2, 4 }, { 3, 4 },
};
```

It may be noted that the first six entries of Table 7 above are identical to that of the previously shown motion vector pairing order. Accordingly, the six consecutive entries may be deemed a shared section.

In another aspect as previously described, according to the current VVC standard draft, the triangle prediction flag is coded based on contexts derived from triangle prediction flag values of the neighboring blocks. However, for actual video content, the correlation among neighboring blocks in terms of selecting the triangle prediction mode may not be high. Some alternative ways of forming the contexts are proposed in coding the triangle prediction flag.

The triangle prediction mode is usually not used when the CIIP mode is selected in current video coding standards. It is not efficient to always signal the triangle prediction flag for a current CU regardless of whether the CIIP mode is selected for the CU or not.

Further, according to the current VVC standard draft, the triangle prediction flag is signaled regardless of whether the MMVD flag is true or not. If the MMVD mode is not used together with the triangle prediction mode, the signaling could also be made mutually exclusive to improve coding efficiency.

Coding Triangle Prediction Flag Using Different Contexts

According to some examples of the present disclosure, if the triangle prediction flag needs to be coded (encoded or decoded) for a current CU, contexts may be derived differently from the current VVC standard draft for CABAC coding.

In some examples of the present disclosure, the contexts are derived based on CU area size (i.e. the value of CU height multiplying with the value of CU width). In other words, CUs in similar sizes may share a same context.

In some other examples of the present disclosure, the contexts are formed based on CU shape (i.e. the ratio of the CU height to the CU width). For example, horizontal orientated rectangular CUs (i.e. the CU width is greater than the CU height) may share a first context, and vertically orientated rectangular CUs (i.e. the CU height is greater than the CU width) may share a second context, and square CUs (i.e. the CU height is equal to the CU width) may share a third context.

In another example, regardless of horizontal or vertical orientations, rectangular shape CUs with similar ratios of the long side to the short side share one context, and square shape CUs share another context. In this case, multiple contexts may be used with each context corresponding to a different ratio of the CU long side to the CU short side, and/or a different range of ratio of the CU long side to the CU short side. For example, a first context for CUs having a ratio of the CU long side to the CU short side greater than 4; a second context for CUs having a ratio of the CU long side to the CU short side greater than 2 but less than 4; a third context for CUs having a ratio of the CU long side to the CU short side greater than 1.5 but less than 2; a fourth context for CUs having a ratio of the CU long side to the CU short side greater than 1 but less than 1.5; and a fifth context for square CUs. Other implementations are also possible.

According to yet another example of the present disclosure, the triangle prediction flag is always coded using one common context, regardless of CU parameters and/or conditions.

Coding Triangle Prediction Flag Relative to CIIP Flag

According to some examples of the present disclosure, the triangle prediction flag may not be coded for a CU if the CIIP prediction mode is selected for the CU. Thus, only when the CIIP prediction mode is not selected for a CU, the triangle prediction flag may be signaled for the CU. In the case that the triangle prediction flag is not signaled, it may be inferred as 0 at the decoder side.

Coding Triangle Prediction Flag Relative to MMVD Flag

According to some other examples of the present disclosure, the triangle prediction flag may not be coded for a CU when the MMVD prediction mode is selected for the CU. Thus, only when the MMVD prediction mode is not selected for a CU, the triangle prediction flag may be signaled for the CU. In the case that the triangle prediction flag is not signaled, it may be inferred as 0 at the decoder side.

Enabling MMVD Prediction on Top of Triangle Prediction Unit

According to some yet further examples of the present disclosure, the MMVD prediction mode may be enabled on top of the triangle prediction unit. In this case, even if the MMVD prediction mode is selected for a CU, the triangle prediction flag may be additionally signaled to indicate that the triangle prediction unit is used. In the case that both the MMVD prediction mode and the triangle prediction mode are true for a CU, MVD related syntaxes under the MMVD mode may be additionally signaled for each of the two triangle prediction units.

Figure 15:
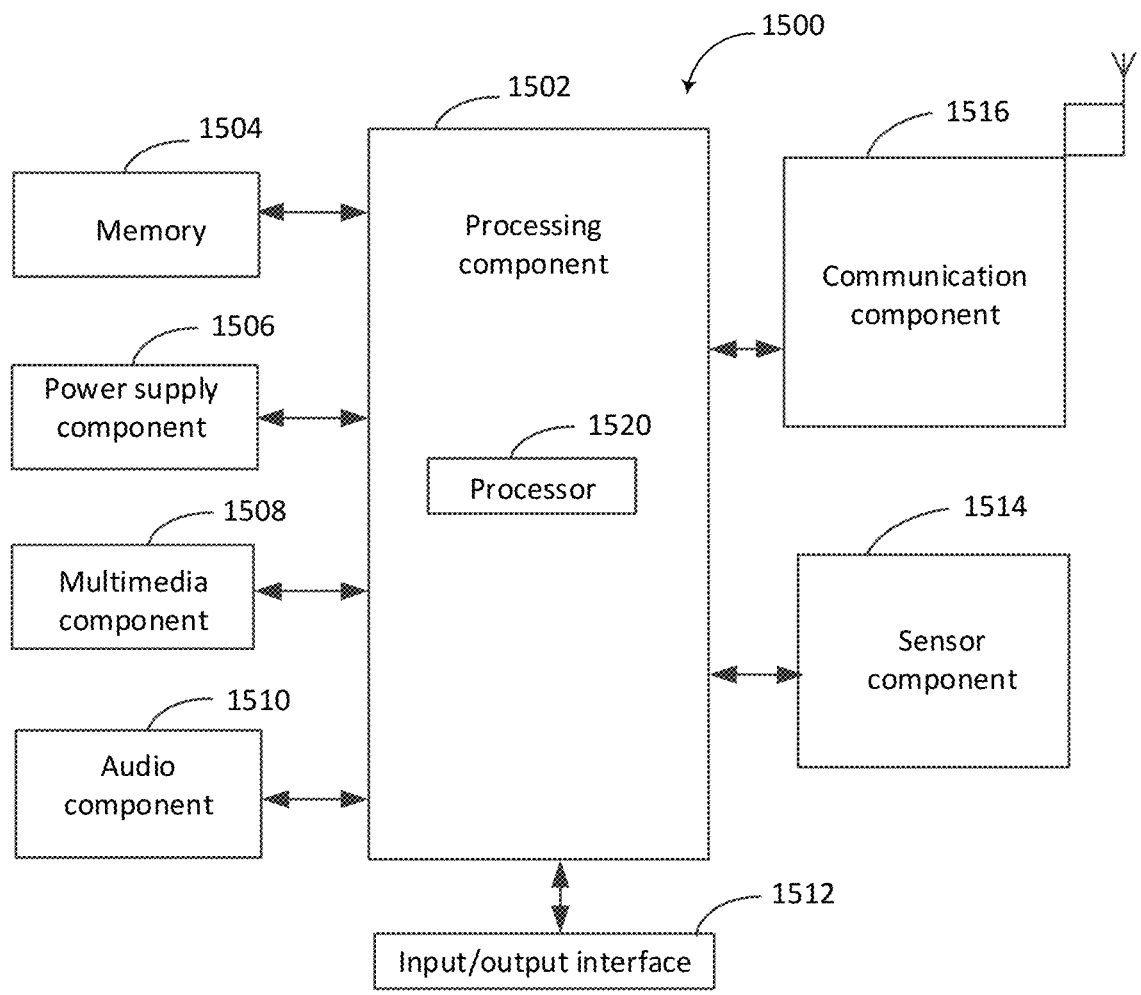
FIG. 15 is a block diagram illustrating an exemplary apparatus for video coding in accordance with some implementations of the present disclosure.

FIG. 15 is a block diagram illustrating an apparatus for video coding in accordance with some implementations of the present disclosure The apparatus 1500 may be a terminal, such as a mobile phone, a tablet computer, a digital broadcast terminal, a tablet device, or a personal digital assistant.

As shown in FIG. 15, the apparatus 1500 may include one or more of the following components: a processing component 1502, a memory 1504, a power supply component 1506, a multimedia component 1508, an audio component 1510, an input/output (I/O) interface 1512, a sensor component 1514, and a communication component 1516.

The processing component 1502 usually controls overall operations of the apparatus 1500, such as operations relating to display, a telephone call, data communication, a camera operation and a recording operation. The processing component 1502 may include one or more processors 1520 for executing instructions to complete all or a part of steps of the above method. Further, the processing component 1502 may include one or more modules to facilitate interaction between the processing component 1502 and other components. For example, the processing component 1502 may include a multimedia module to facilitate the interaction between the multimedia component 1508 and the processing component 1502.

The memory 1504 is configured to store different types of data to support operations of the apparatus 1500. Examples of such data include instructions, contact data, phonebook data, messages, pictures, videos, and so on for any application or method that operates on the apparatus 1500. The memory 1504 may be implemented by any type of volatile or non-volatile storage devices or a combination thereof, and the memory 1504 may be a Static Random Access Memory (SRAM), an Electrically Erasable Programmable Read-Only Memory (EEPROM), an Erasable Programmable Read-Only Memory (EPROM), a Programmable Read-Only Memory (PROM), a Read-Only Memory (ROM), a magnetic memory, a flash memory, a magnetic disk or a compact disk.

The power supply component 1506 supplies power for different components of the apparatus 1500. The power supply component 1506 may include a power supply management system, one or more power supplies, and other components associated with generating, managing and distributing power for the apparatus 1500.

The multimedia component 1508 includes a screen providing an output interface between the apparatus 1500 and a user. In some examples, the screen may include a LCD and a Touch Panel (TP). If the screen includes a touch panel, the screen may be implemented as a touch screen receiving an input signal from a user. The touch panel may include one or more touch sensors for sensing a touch, a slide and a gesture on the touch panel. The touch sensor may not only sense a boundary of a touching or sliding actions, but also detect duration and pressure related to the touching or sliding operation. In some examples, the multimedia component 1508 may include a front camera and/or a rear camera. When the apparatus 1500 is in an operation mode, such as a shooting mode or a video mode, the front camera and/or the rear camera may receive external multimedia data.

The audio component 1510 is configured to output and/or input an audio signal. For example, the audio component 1510 includes a microphone (MIC). When the apparatus 1500 is in an operating mode, such as a call mode, a recording mode and a voice recognition mode, the microphone is configured to receive an external audio signal. The received audio signal may be further stored in the memory 1504 or sent via the communication component 1516. In some examples, the audio component 1510 further includes a speaker for outputting an audio signal.

The I/O interface 1512 provides an interface between the processing component 1502 and a peripheral interface module. The above peripheral interface module may be a keyboard, a click wheel, a button, or the like. These buttons may include but not limited to, a home button, a volume button, a start button and a lock button.

The sensor component 1514 includes one or more sensors for providing a state assessment in different aspects for the apparatus 1500. For example, the sensor component 1514 may detect an on/off state of the apparatus 1500 and relative locations of components. For example, the components are a display and a keypad of the apparatus 1500. The sensor component 1514 may also detect a position change of the apparatus 1500 or a component of the apparatus 1500, presence or absence of a contact of a user on the apparatus 1500, an orientation or acceleration/deceleration of the apparatus 1500, and a temperature change of apparatus 1500. The sensor component 1514 may include a proximity sensor configured to detect presence of a nearby object without any physical touch. The sensor component 1514 may further include an optical sensor, such as a CMOS or CCD image sensor used in an imaging application. In some examples, the sensor component 1514 may further include an acceleration sensor, a gyroscope sensor, a magnetic sensor, a pressure sensor, or a temperature sensor.

The communication component 1516 is configured to facilitate wired or wireless communication between the apparatus 1500 and other devices. The apparatus 1500 may access a wireless network based on a communication standard, such as WiFi, 4G, or a combination thereof. In an example, the communication component 1516 receives a broadcast signal or broadcast related information from an external broadcast management system via a broadcast channel. In an example, the communication component 1516 may further include a Near Field Communication (NFC) module for promoting short-range communication. For example, the NFC module may be implemented based on Radio Frequency Identification (RFID) technology, infrared data association (IrDA) technology, Ultra-Wide Band (UWB) technology, Bluetooth (BT) technology and other technology.

In an example, the apparatus 1500 may be implemented by one or more of Application Specific Integrated Circuits (ASIC), Digital Signal Processors (DSP), Digital Signal Processing Devices (DSPD), Programmable Logic Devices (PLD), Field Programmable Gate Arrays (FPGA), controllers, microcontrollers, microprocessors or other electronic elements to perform the above method.

A non-transitory computer readable storage medium may be, for example, a Hard Disk Drive (HDD), a Solid-State Drive (SSD), Flash memory, a Hybrid Drive or Solid-State Hybrid Drive (SSHD), a Read-Only Memory (ROM), a Compact Disc Read-Only Memory (CD-ROM), a magnetic tape, a floppy disk and etc.

FIG. 16 is a flowchart illustrating an exemplary process of video coding for motion compensated prediction using triangular prediction in accordance with some implementations of the present disclosure.

In step 1602, the processor 1520 partitions video pictures into a plurality of coding units (CUs), at least one of which is further portioned into two prediction units (PUs) including at least one triangular shaped PU with a partitioning orientation in one of: from top-left corner to bottom-right corner 702, and from top-right corner to bottom-left corner 704. In step 1604, the processor 1520 constructs a uni-prediction motion vector candidate list. In step 1606, the processor 1520 determines whether a current CU is coded as triangle prediction mode according to coded information. In step 1608, the processor 1520 signals a partition orientation flag indicating the partitioning orientation. In step 1610, the processor 1520 signals index values that indicate selected entries in the constructed uni-prediction motion vector candidate list.

FIG. 17 is a flowchart illustrating an exemplary process of video coding for triangle prediction flag in accordance with some implementations of the present disclosure.

In step 1702, the processor 1520 partitions video pictures into a plurality of coding units (CUs), at least one of which is further portioned into two prediction units (PUs) including at least one triangular shaped PU.

In step 1704, the processor 1520 determines whether a triangle prediction flag, which indicates triangle prediction mode, is to be decoded for a current CU.

In step 1706, the processor 1520 derives the triangle prediction flag using CABAC upon determining that the triangle prediction flag is to be decoded for the current CU.

Contexts of the CABAC for the triangle prediction flag are derived based on at least one selected from a group consisting of: a CU area size; a CU shape; and a common context.

In some examples, there is provided an apparatus for video coding. The apparatus includes a processor 1520; and a memory 1504 configured to store instructions executable by the processor; where the processor, upon execution of the instructions, is configured to perform a method as illustrated in FIG. 16, or a method as illustrated in FIG. 17.

In some other examples, there is provided a non-transitory computer readable storage medium 1504, having instructions stored therein. When the instructions are executed by a processor 1520, the instructions cause the processor to perform a method as illustrated in FIG. 16, or a method as illustrated in FIG. 17.

The description of the present disclosure has been presented for purposes of illustration, and is not intended to be exhaustive or limited to the present disclosure. Many modifications, variations, and alternative implementations will be apparent to those of ordinary skill in the art having the benefit of the teachings presented in the foregoing descriptions and the associated drawings.

The examples were chosen and described in order to explain the principles of the disclosure, and to enable others skilled in the art to understand the disclosure for various implementations and to best utilize the underlying principles and various implementations with various modifications as are suited to the particular use contemplated. Therefore, it is to be understood that the scope of the disclosure is not to be limited to the specific examples of the implementations disclosed and that modifications and other implementations are intended to be included within the scope of the present disclosure.

What is claimed is:

1. A method for video encoding comprising:
   partitioning video pictures into a plurality of coding units (CUs), at least one of which is further partitioned into two prediction units (PUs);
   in response to determining that the MMVD prediction mode and the triangle prediction mode are enabled, signaling Motion Vector Difference (MVD) related syntax elements under the MMVD prediction mode for a triangle PU in a current CU;
   wherein in response to determining that all other merge related modes are signaled as disabled, the triangle prediction mode is inferred to be enabled.

2. The method of claim 1, further comprises:
   signaling an MMVD prediction flag indicating whether the MMVD prediction mode is enabled.

3. The method of claim 1, further comprises:
   signaling a triangle prediction flag indicating whether the triangle prediction mode is enabled.

4. The method of claim 1, further comprising:
   in response to determining that the triangle prediction mode is enabled, signaling a partition orientation syntax element indicating a partitioning orientation; and
   signaling index values corresponding to selected uni-prediction motion vector candidates, in particular two uni-prediction motion vector candidates.

5. The method of claim 4, wherein the partition orientation syntax element is coded as Context-based Adaptive Binary Arithmetic Coding (CABAC) bypass bin.

6. The method of claim 1, wherein
   in response to determining that a triangle prediction tool enable/disable flag signaled in sequence parameter set (SPS) is false, the triangle prediction mode is inferred to be disabled.

7. An apparatus for video encoding comprising:
   one or more processors; and
   a memory coupled to the one or more processors;
   wherein the one or more processors are configured to perform acts comprising:
   partitioning video pictures into a plurality of coding units (CUs), at least one of which is further partitioned into two prediction units (PUs);
   in response to determining that the MMVD prediction mode and the triangle prediction mode are enabled, signaling Motion Vector Difference (MVD) related syntax elements under the MMVD prediction mode for a triangle PU in a current CU;
   wherein in response to determining that all other merge related modes are signaled as disabled, the triangle prediction mode is inferred to be enabled.

8. The apparatus of claim 7, wherein the one or more processors are further configured to perform acts comprising:
   signaling an MMVD prediction flag indicating whether the MMVD prediction mode is enabled.

9. The apparatus of claim 7, wherein the one or more processors are further configured to perform acts comprising:
   signaling a triangle prediction flag indicating whether the triangle prediction mode is enabled.

10. The apparatus of claim 7, wherein the one or more processors are further configured to perform acts comprising:
    in response to determining that the triangle prediction mode is enabled, signaling a partition orientation syntax element indicating a partitioning orientation; and
    signaling index values corresponding to selected uni-prediction motion vector candidates, in particular two uni-prediction motion vector candidates.

11. The apparatus of claim 10, wherein the partition orientation syntax element is coded as Context-based Adaptive Binary Arithmetic Coding (CABAC) bypass bin.

12. The apparatus of claim 7, wherein
    in response to determining that a triangle prediction tool enable/disable flag signaled in sequence parameter set (SPS) is false, the triangle prediction mode is inferred to be disabled.

13. A non-transitory computer-readable storage medium storing a bitstream, wherein the bitstream comprises the encoded video data is generated by acts comprising:
    partitioning video pictures into a plurality of coding units (CUs); and
    in response to determining that a current CU is coded in an inter prediction mode, signaling coded information for inferring whether the current CU is coded in triangle prediction mode, at least one of which is further partitioned into two prediction units (PUs);

in response to determining that the MMVD prediction mode and the triangle prediction mode are enabled, signaling Motion Vector Difference (MVD) related syntax elements under the MMVD prediction mode for a triangle PU in a current CU;

wherein in response to determining that all other merge related modes are signaled as disabled, the triangle prediction mode is inferred to be enabled.

* * * * *